US012713451B2

(12) United States Patent
Alawieh et al.

(10) Patent No.: US 12,713,451 B2
(45) Date of Patent: Aug. 18, 2026

(54) POSITIONING FOR USER EQUIPMENTS WITH LIMITED CAPABILITIES

(71) Applicant: Fraunhofer-Gesellschaft zur Förderung der angewandten Forschung e.V., Munich (DE)

(72) Inventors: Mohammad Alawieh, Erlangen (DE); Birendra Ghimire, Erlangen (DE); Ernst Eberlein, Erlangen (DE); Norbert Franke, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 417 days.

(21) Appl. No.: 18/391,263

(22) Filed: Dec. 20, 2023

(65) Prior Publication Data

US 2024/0163908 A1 May 16, 2024

Related U.S. Application Data

(63) Continuation of application No. PCT/EP2022/067718, filed on Jun. 28, 2022.

(30) Foreign Application Priority Data

Jun. 30, 2021 (EP) .................................... 21182853

(51) Int. Cl.
*H04W 72/40* (2023.01)
*H04W 92/18* (2009.01)

(52) U.S. Cl.
CPC ............ *H04W 72/40* (2023.01); *H04W 92/18* (2013.01)

(58) Field of Classification Search
CPC ..... H04W 72/40; H04W 92/18; H04W 64/00; H04W 56/001; H04W 76/14;
(Continued)

(56) References Cited

U.S. PATENT DOCUMENTS

2016/0095080 A1* 3/2016 Khoryaev ............. G01S 5/0284 455/456.1
2016/0183044 A1* 6/2016 Wei ....................... H04W 76/14 455/456.1
(Continued)

FOREIGN PATENT DOCUMENTS

CN 112 840 713 A 5/2021
WO 2019/165224 A1 8/2019
(Continued)

OTHER PUBLICATIONS

ETSI, "5G; NR; Radio Resource Control (RRC); Protocol specification", TS38.331 v16.1.0, Jul. 2020.
(Continued)

*Primary Examiner* — Nimesh Patel
(74) *Attorney, Agent, or Firm* — Bridgeway IP Law Group, PLLC; Jihun Kim

(57) ABSTRACT

A user equipment for transmitting and receiving data in a wireless communication system is configured to receive a configuration message over one or more first resources, wherein the configuration message has configuration information indicating one or more second resources. Moreover, the user equipment is configured to employ the configuration information for transmitting or for receiving a reference signal for positioning over the one or more second resources.

25 Claims, 9 Drawing Sheets

(58) Field of Classification Search
CPC . H04W 4/023; H04W 24/10; H04W 72/0446; H04W 72/25; H04W 72/02; H04W 4/40; H04W 4/029; H04W 72/0453; H04W 72/20; H04W 72/542; H04W 74/0808; H04W 72/0473; H04W 4/70; H04W 72/52; H04W 4/02; H04W 72/56; H04W 8/005; H04W 52/42; H04W 72/51; H04W 74/0816; H04W 72/044; H04W 72/121; H04W 16/28; H04W 72/12; H04W 84/042; H04W 52/0245; H04W 4/38; H04W 72/04; H04W 72/231; H04W 72/50; H04W 72/535; H04W 72/54; H04W 74/006; H04W 76/15; H04W 76/23; G01S 5/0205; G01S 5/0236; G01S 5/0036; G01S 5/10; G01S 2205/008; G01S 5/0009; G01S 13/765; G01S 5/0072; G01S 1/042; G01S 5/02; G01S 5/0284; G01S 5/06; H04L 5/0007; H04L 5/0051; H04L 5/0053; H04L 5/0094; H04L 5/001; H04L 5/0048; H04L 5/0037; H04L 5/0023; H04L 5/0012; H04L 5/0005; H04L 5/0057; H04L 1/1854; H04L 25/0224; H04L 5/0016; H04L 1/0668; H04L 2209/80; H04L 63/065; H04L 5/22; Y02D 30/70; H04B 17/318; H04B 7/0632; H04B 7/0413; H04B 7/0617; H04B 17/309; H04B 7/212; H04B 7/06954; H04B 17/255; H04B 17/27; H04B 17/345; H04B 17/373; H04B 17/3913; H04B 7/088; H04B 7/0891; H04B 7/06958; H04B 7/0678
See application file for complete search history.

(56) References Cited

U.S. PATENT DOCUMENTS

| | | | | |
|---|---|---|---|---|
| 2018/0279289 | A1 | 9/2018 | Islam et al. | |
| 2019/0230618 | A1* | 7/2019 | Saur | H04W 56/001 |
| 2020/0235877 | A1 | 7/2020 | Manolakos et al. | |
| 2020/0314793 | A1 | 10/2020 | Kumar et al. | |
| 2021/0045061 | A1* | 2/2021 | Akkarakaran | H04L 5/0007 |
| 2021/0099832 | A1* | 4/2021 | Duan | G01S 5/0072 |
| 2021/0112474 | A1 | 4/2021 | Alexandros et al. | |
| 2021/0120522 | A1 | 4/2021 | Kim et al. | |
| 2022/0217684 | A1* | 7/2022 | Zhao | H04W 72/02 |
| 2022/0393820 | A1* | 12/2022 | Keating | H04W 76/14 |
| 2023/0209519 | A1 | 6/2023 | Mingju | |

FOREIGN PATENT DOCUMENTS

| | | | |
|---|---|---|---|
| WO | 2019/212246 | A1 | 11/2019 |
| WO | 2021/092813 | A1 | 5/2021 |
| WO | 2021/119127 | A1 | 6/2021 |

OTHER PUBLICATIONS

3GPP, "3rd Generation Partnership Project; Technical Specification Group Radio Access Network; LTE Positioning Protocol (LPP)", TS37.355 v16.1.0, Jul. 2020.
ETSI, "5G; NG-RAN; NR Positioning Protocol A (NRPPa)", TS38.455 v1.0.0, Sep. 2020.
3GPP, "3rd Generation Partnership Project; Technical Specification Group Radio Access Network; NR; User Equipment (UE) conformance specification; Radio Resource Management (RRM)", TS 38.533 v16.1.0, Sep. 2019.
3GPP, "3rd Generation Partnership Project; Technical Specification Group Radio Access Network; NR; User Equipment (UE) radio access capabilities", TS.38.306 v16.1.0, Jul. 2020.
3GPP, "3rd Generation Partnership Project; Technical Specification Group Radio Access Network; Overall description of Radio Access Network (RAN) aspects for Vehicle-to-everything (V2X) based on LTE and NR", TR 37.985 v16.1.0, Mar. 2022.
3GPP, "3rd Generation Partnership Project; Technical Specification Group Radio Access Network; NR; Physical layer procedures for data (Release 16)", TS 38.214 V16.1.0, Mar. 2020.
3GPP TSG-RAN WG1 Meeting #114, "Change Request", R1-2308719, 38.214 CR 0440 Rev—Current version: 17.6.0, Aug. 2023.

* cited by examiner

POSITIONING FOR USER EQUIPMENTS WITH LIMITED CAPABILITIES

CROSS-REFERENCE TO RELATED APPLICATIONS

This application is a continuation of copending International Application No. PCT/EP2022/067718, filed Jun. 28, 2022, which is incorporated herein by reference in its entirety, and additionally claims priority from European Application No. 21182853.8, filed Jun. 30, 2021, which is also incorporated herein by reference in its entirety.

TECHNICAL FIELD

The present invention relates to the field of wireless communication systems or networks, more specifically to positioning for user equipments with limited capabilities.

BACKGROUND OF THE INVENTION

FIG. 1 is a schematic representation of an example of a terrestrial wireless network 100 including, as is shown in FIG. 1(*a*), the core network and one or more radio access networks $RAN_1$, $RAN_2$, . . . $RAN_N$ (RAN=Radio Access Network). FIG. 1(*b*) is a schematic representation of an example of a radio access network $RAN_n$ that may include one or more base stations $gNB_1$ to $gNB_5$ (gNB=next generation Node B), each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT (Internet of Things) devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, (UE=User Equipment) also referred to as user equipment, $UE_1$ that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base stations $gNB_1$ to $gNB_5$ may be connected to the core network 102, e.g. via the S1 interface, via respective backhaul links $\mathbf{114}_1$ to $\mathbf{114}_5$, which are schematically represented in FIG. 1(*b*) by the arrows pointing to "core". The core network 102 may be connected to one or more external networks. The external network may be the Internet or a private network, such as an intranet or any other type of campus networks, e.g. a private WiFi or 4G or 5G mobile communication system. Further, some or all of the respective base stations $gNB_1$ to $gNB_5$ may be connected, e.g. via the S1 or X2 interface or the XN interface in NR (New Radio), with each other via respective backhaul links $\mathbf{116}_1$ to $\mathbf{116}_5$, which are schematically represented in FIG. 1(*b*) by the arrows pointing to "gNBs". A sidelink channel allows direct communication between UEs, also referred to as device-to-device, D2D (Device to Device), communication. The sidelink interface in 3GPP (3G Partnership Project) is named PC5 (Proximity-based Communication 5).

For data transmission a physical resource grid may be used. The physical resource grid may comprise a set of resource elements to which various physical channels and physical signals are mapped. For example, the physical channels may include the physical downlink, uplink and sidelink shared channels, PDSCH (Physical Downlink Shared CHannel), PUSCH (Physical Uplink Shared Channel), PSSCH (Physical Sidelink Shared Channel), carrying user specific data, also referred to as downlink, uplink and sidelink payload data, the physical broadcast channel, PBCH (Physical Broadcast Channel), carrying for example a master information block, MIB, and one or more of a system information block, SIB, one or more sidelink information blocks, SLIBs, if supported, the physical downlink, uplink and sidelink control channels, PDCCH (Physical Downlink Control Channel), PUCCH (Physical Uplink Control CHannel), PSCCH (Physical Sidelink Control Channel), the downlink control information, DCI, the uplink control information, UCI, and the sidelink control information, SCI, and physical sidelink feedback channels, PSFCH (Physical sidelink feedback channel), carrying PC5 feedback responses. Note, the sidelink interface may support a 2-stage SCI (Speech Call Items). This refers to a first control region comprising some parts of the SCI, and, optionally, a second control region, which comprises a second part of control information.

For the uplink, the physical channels may further include the physical random-access channel, PRACH (Packet Random Access Channel) or RACH (Random Access Channel), used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols (OFDM=Orthogonal Frequency-Division Multiplexing) depending on the cyclic prefix, CP, length. A frame may also include of a smaller number of OFDM symbols, e.g. when utilizing a shortened transmission time interval, sTTI (slot or subslot transmission time interval), or a mini-slot/non-slot-based frame structure comprising just a few OFDM symbols.

The wireless communication system may be any single-tone or multicarrier system using frequency-division multiplexing, like orthogonal frequency-division multiplexing, OFDM, or orthogonal frequency-division multiple access, OFDMA (Orthogonal frequency-division multiple access), or any other IFFT-based signal (IFFT=Inverse Fast Fourier Transformation) with or without CP, e.g. DFT-s-OFDM (DFT=discrete Fourier transform). Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base stations $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, or roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

In a wireless communication network, like the one depicted in FIG. 1, it may be desired to locate a UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

It is noted that the information in the above section is only for enhancing the understanding of the background of the invention and, therefore, it may comprise information that does not form known technology that is already known to a person of ordinary skill in the art.

Starting from the above, there may be a need for improvements or enhancements for a wireless communication system or network and its components.

SUMMARY

An embodiment may have a user equipment for transmitting and receiving data in a wireless communication system, wherein the user equipment is configured to receive a configuration message over one or more first sidelink resources from another user equipment over a sidelink, wherein the configuration message has configuration information indicating one or more second sidelink resources, wherein a total bandwidth of the one or more second sidelink resources used for receiving, by the user equipment, the reference signal from the other user equipment is larger than a total bandwidth of the one or more first sidelink resources used for receiving the configuration message from the other user equipment, wherein the user equipment is configured to employ the configuration information for receiving as the reference signal a sidelink reference signal for positioning over the one or more second sidelink resources from the other user equipment, wherein the user equipment is configured to measure one or more properties (e.g., a signal characteristics and/or a time-of-arrival) of the sidelink reference signal received by the user equipment over the one or more second resources depending on a reception capability for positioning of the user equipment.

Another embodiment may have a user equipment for transmitting and receiving data in a wireless communication system, wherein the user equipment is configured to transmit a configuration message over one or more first sidelink resources to another user equipment over a sidelink, wherein the configuration message has configuration information indicating one or more second sidelink resources, wherein a total bandwidth of the one or more second sidelink resources used for transmitting, by the user equipment, the reference signal to the other user equipment is larger than a total bandwidth of the one or more first sidelink resources used for transmitting the configuration message to the other user equipment, wherein the user equipment is configured to transmit as the reference signal a sidelink reference signal for positioning over the one or more second sidelink resources to the other user equipment.

According to another embodiment, a method for transmitting and receiving data by a user equipment in a wireless communication system may have the steps of: receiving, by the user equipment, a configuration message over one or more first sidelink resources from another user equipment over a sidelink, wherein the configuration message has configuration information indicating one or more second sidelink resources, wherein a total bandwidth of the one or more second sidelink resources used for receiving, by the user equipment, the reference signal from the other user equipment is larger than a total bandwidth of the one or more first sidelink resources used for receiving the configuration message from the other user equipment, employing, by the user equipment, the configuration information for receiving as the reference signal a sidelink reference signal for positioning over the one or more second sidelink resources from the other user equipment, and measuring, by the user equipment, one or more properties (e.g., a signal characteristics and/or a time-of-arrival) of the sidelink reference signal received by the user equipment over the one or more second resources depending on a reception capability for positioning of the user equipment.

According to another embodiment, a method for transmitting and receiving data by a user equipment in a wireless communication system may have the steps of: transmitting, by the user equipment, a configuration message over one or more first sidelink resources to another user equipment over a sidelink, wherein the configuration message has configuration information indicating one or more second sidelink resources, wherein a total bandwidth of the one or more second sidelink resources used for transmitting, by the user equipment, the reference signal to the other user equipment is larger than a total bandwidth of the one or more first sidelink resources used for transmitting the configuration message to the other user equipment, and transmitting, by the user equipment, as the reference signal a sidelink reference signal for positioning over the one or more second sidelink resources to the other user equipment.

Still another embodiment may have a non-transitory computer-readable medium having a computer program for implementing the above methods for transmitting and receiving data by a user equipment in a wireless communication system, when the method is implemented by a computer or signal processor.

A user equipment for transmitting and receiving data in a wireless communication system according to an embodiment is provided. The user equipment is configured to receive a configuration message over one or more first resources, wherein the configuration message comprises configuration information indicating one or more second resources. Moreover, the user equipment is configured to employ the configuration information for transmitting or for receiving a reference signal for positioning over the one or more second resources.

According to an embodiment, the configuration message may, e.g., indicate, which resources of a plurality of resources are intended to be used for wideband positioning information, by indicating that a transmission of wideband positioning information is allowed using two or more carriers of a plurality of carriers in one or more slots of a plurality of slots. The user equipment may, e.g., be configured to transmit or to receive the wideband positioning information in said two or more carriers in at least one of said one or more slots.

In an embodiment, the configuration message may, e.g., indicate, which resources of a plurality of resources are intended to be used for wideband positioning information, by indicating that a transmission of wideband positioning information is allowed using different bandwidth parts of a same carrier in one or more slots of a plurality of slots. The user equipment may, e.g., be configured to transmit or to receive the wideband positioning information in said different bandwidth parts of the same carrier in at least one of said one or more slots.

In an embodiment, the user equipment may, e.g., be configured to transmit a capability message to the network entity of the wireless communication system, such that the capability message comprises first information on a first bandwidth the user equipment can handle in downlink and/or uplink for a first kind of traffic, and such that the capability message comprises second information on a second bandwidth the user equipment can handle in downlink and/or uplink for a second kind of traffic, wherein the second kind of traffic is different from the first kind of traffic, wherein the second kind of traffic comprises traffic for positioning. The user equipment is configured to receive the configuration message from the network entity, wherein the configuration message comprises information on one or more bandwidth parts depending on the capability message of the user equipment. Moreover, the user equipment is configured to employ the information on the one or more bandwidth parts for transmitting or for receiving the reference signal.

According to an embodiment, the user equipment is configured to receive the reference signal for positioning over a first carrier, and is configured to use said reference signal for transmitting a sounding or positioning signal in a supplemental uplink carrier.

In an embodiment, the user equipment is configured to receive first configuration information on a first carrier from a master node. The user equipment is configured to receive second configuration information on a second carrier from a secondary node via the master node. Moreover, the user equipment is configured to employ the first configuration information and the second configuration information for transmitting or for receiving the reference signal for positioning over the first carrier and over the second carrier.

According to an embodiment, the user equipment may, e.g., be configured to transmit an uplink reference signal to a network entity of the wireless communication system, or to receive a downlink reference signal from the network entity. The user equipment may, e.g., be configured to transmit a capability message to the network entity, such that the capability message comprises information that the user equipment is capable of transmitting an uplink positioning signal as the reference signal and/or capable of receiving a downlink positioning signal as the reference signal. Depending on whether or not a user equipment is located in a (predefined/positioning) area, the user equipment may, e.g., be configured to receive the configuration message from the network entity, which indicates a configuration for transmitting the uplink positioning signal or for receiving the downlink positioning signal over the one or more second resources. Depending on said configuration, the user equipment may, e.g., be configured to transmit the uplink positioning signal with a higher bandwidth than the uplink reference signal, or the user equipment is configured to receive the downlink positioning signal with a larger bandwidth than the downlink reference signal.

Moreover, a network entity for a wireless communication system according to an embodiment is provided. The network entity is configured to transmit a configuration message over one or more first resources to a user equipment of the wireless communication system, wherein the configuration message comprises configuration information indicating one or more second resources. The configuration information is suitable to be employed by the user equipment for transmitting or for receiving a reference signal for positioning over the one or more second resources.

Furthermore, a method for transmitting and receiving data in a wireless communication system according to an embodiment is provided. The method comprises:

Receiving a configuration message over one or more first resources, wherein the configuration message comprises configuration information indicating one or more second resources. And:

Employing the configuration information for transmitting or for receiving a reference signal for positioning over the one or more second resources.

Moreover, a method for a wireless communication system according to an embodiment is provided. The method comprises:

Transmitting a configuration message over one or more first resources to a user equipment of the wireless communication system, wherein the configuration message comprises configuration information indicating one or more second resources.

The configuration information is suitable to be employed by the user equipment for transmitting or for receiving a reference signal for positioning over the one or more second resources.

Furthermore, a non-transitory computer program product comprising a computer readable medium storing instructions which, when executed on a computer, perform one of the above described methods is provided.

BRIEF DESCRIPTION OF THE DRAWINGS

Embodiments of the present invention will be detailed subsequently referring to the appended drawings, in which.

DETAILED DESCRIPTION OF THE INVENTION

Figures 1A, 1B:
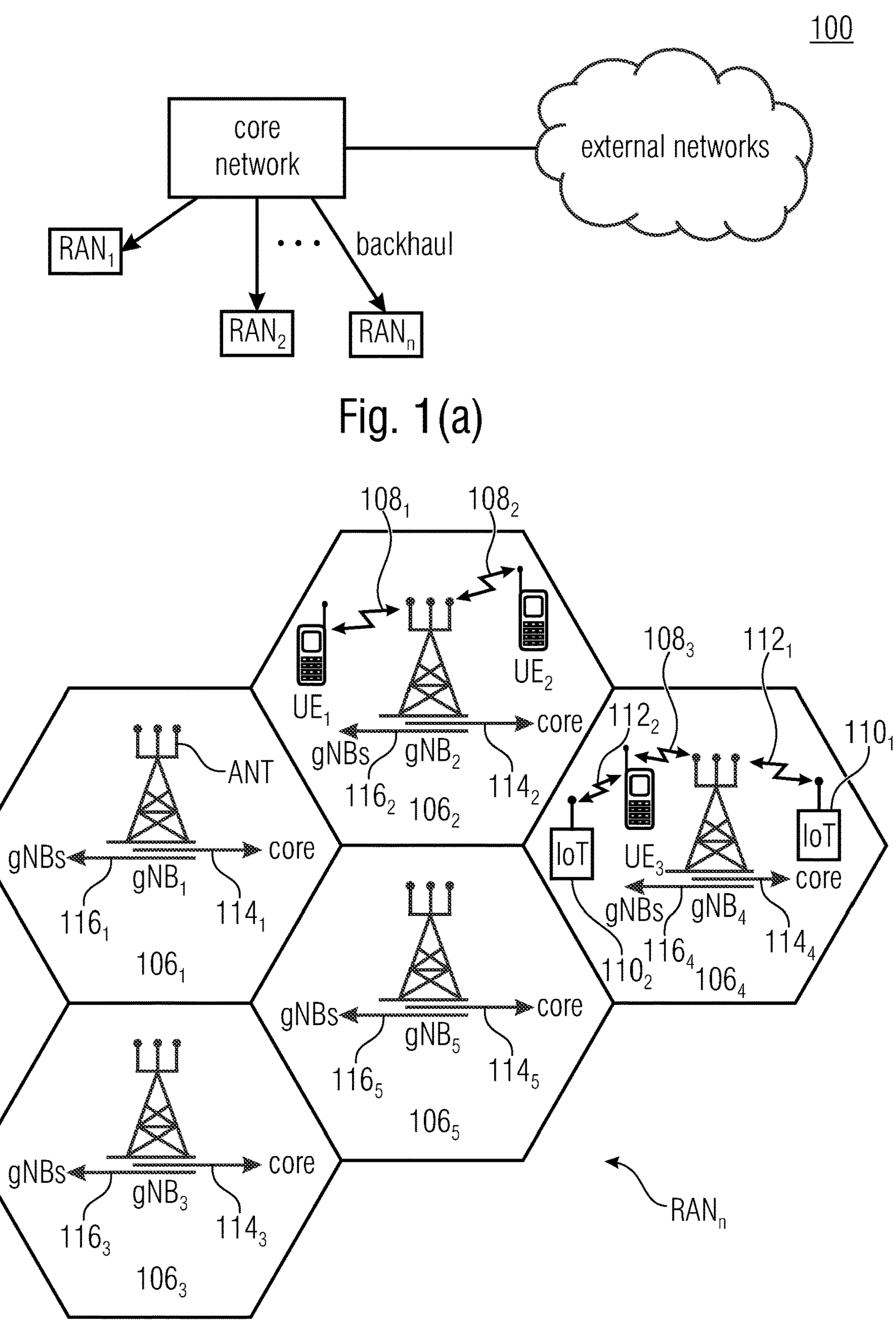
FIGS. 1(*a*) and 1(*b*) illustrate a schematic representation of an example of a terrestrial wireless network.

Embodiments of the present invention are now described in more detail with reference to the accompanying drawings, in which the same or similar elements have the same reference signs assigned.

A user equipment for transmitting and receiving data in a wireless communication system according to an embodiment is provided.

The user equipment is configured to receive a configuration message over one or more first resources, wherein the configuration message comprises configuration information indicating one or more second resources.

Moreover, the user equipment is configured to employ the configuration information for transmitting or for receiving a reference signal for positioning over the one or more second resources.

According to an embodiment, the user equipment may, e.g., be configured to apply an uplink reference signal configuration over the one or more second resources depending on a transmission capability for positioning of the user equipment.

In an embodiment, if the transmission capability for positioning of the user equipment includes a transmit-only capability for the carrier and/or bandwidth used by the positioning signal, the user equipment may, e.g., be configured to perform one or more downlink reference signal measurements on the one or more first resources by conducting one or more power control and/or timing advance and/or spatial filter selection measurements.

According to an embodiment, if the transmission capability for positioning of the user equipment includes a transmit-and-receive capability, the user equipment may, e.g., be configured to perform one or more downlink reference signal measurements on the one or more second resources.

In an embodiment, the user equipment may, e.g., be configured to measure one or more properties (e.g., a signal characteristics and/or a time-of-arrival) of a downlink reference signal received by the user equipment over the one or more second resources depending on a reception capability for positioning of the user equipment, wherein the user equipment is configured to receive assistance data corresponding to one or more downlink reference signals on the one or more first resources.

According to an embodiment, the user equipment may, e.g., be configured to measure one or more properties (e.g., a signal characteristics and/or a time-of-arrival) of a sidelink reference signal received by the user equipment over the one or more second resources depending on a reception capability for positioning of the user equipment, wherein the user equipment is configured to receive assistance data corresponding to one or more sidelink reference signals on the first resources.

In an embodiment, the user equipment may, e.g., be configured to receive the configuration message from a network entity of the wireless communication system. and/or the user equipment may, e.g., be configured to transmit or to receive the reference signal from the network entity. The network entity may, e.g., be a base station, or the network entity may, e.g., be another user equipment.

According to an embodiment, the configuration message may, e.g., indicate, which resources of a plurality of resources are intended to be used for wideband positioning information, by indicating that a transmission of wideband positioning information may, e.g., be allowed using two or more carriers of a plurality of carriers or different bandwidth parts of a same carrier in one or more slots of a plurality of slots. The user equipment may, e.g., be configured to transmit or to receive the wideband positioning information in said two or more carriers on said different bandwidth parts of the same carrier in at least one of said one or more slots.

In an embodiment, the configuration message indicates, which further resources of the plurality of resources are intended to be used for transmitting data and for transmitting control information, by indicating that a transmission of data and control information may, e.g., be allowed using one of the two or more carriers in one or more further slots of the plurality of slots. The user equipment may, e.g., be configured to transmit or to receive user data or control information in said one of the two or more carriers in at least one of said one or more further slots.

According to an embodiment, a bandwidth used for the transmission or reception of the wideband positioning data may, e.g., be larger than a bandwidth used for the transmission and reception of the user data or the control information.

In an embodiment, the user equipment may, e.g., be configured to transmit an uplink positioning reference signal or an uplink sounding reference signal as the wideband positioning information using said two or more carriers in said at least one of said one or more slots.

According to an embodiment, the user equipment may, e.g., be configured to transmit the transmitted uplink positioning reference signal or the uplink sounding reference signal using said two or more carriers, so that the transmitted uplink positioning reference signal or the uplink sounding reference signal in said at least one of said one or more slots can be received by at least two base stations.

In an embodiment, the user equipment may, e.g., be configured to receive a downlink positioning reference signal as the wideband positioning information in said two or more carriers in said at least one of said one or more slots.

According to an embodiment, the plurality of carriers are a plurality of frequency band carriers, and the two or more carriers are two or more frequency band carriers.

If the UE is not capable of simultaneous reception and transmission on carrier c1 and carrier c2, the UE is not expected to be configured or indicated with SRS resource(s)

such that SRS transmission on carrier c1 would collide with the Resource Elements corresponding to the SS/PBCH blocks configured for the UE or the slots belonging to a control resource set indicated by MIB or SIB1 on c2.

Thus, in an embodiment, if the user equipment may, e.g., be not capable of simultaneous reception and transmission on a first carrier (c1) and on a second carrier (c2), the user equipment may, e.g., be not to be configured (or indicated) with one or more sounding reference signal resources, such that a sounding reference signal transmission on the first carrier (c1) would collide with resource elements corresponding to the SS/PBCH blocks configured for the user equipment or with slots belonging to a control resource set indicated by a master information block (MIB) or a system information block 1 (SIB1) on the second carrier (c2).

According to an embodiment, the plurality of slots are a set of semi-persistent time slots configured by the network.

In an embodiment, the user equipment may, e.g., be configured to transmit a capability message to the network entity of the wireless communication system, such that the capability message comprises first information on a first bandwidth the user equipment can handle in downlink and/or uplink for a first kind of traffic, and such that the capability message comprises second information on a second bandwidth the user equipment can handle in downlink and/or uplink for a second kind of traffic, wherein the second kind of traffic may, e.g., be different from the first kind of traffic, wherein the second kind of traffic comprises traffic for positioning. The user equipment may, e.g., be configured to receive the configuration message from the network entity, wherein the configuration message comprises information on one or more bandwidth parts depending on the capability message of the user equipment. Moreover, the user equipment may, e.g., be configured to employ the information on the one or more bandwidth parts for transmitting or for receiving the reference signal.

According to an embodiment, the user equipment may, e.g., be configured to receive the configuration message which specifies one or more first bandwidth parts for transmitting or receiving the first kind of data traffic, and wherein the configuration message specifies one or more second bandwidth parts for transmitting or receiving the second kind of traffic comprising the traffic for positioning. The user equipment may, e.g., be configured to transmit or to receive the first kind of traffic in the one or more first bandwidth parts. Moreover, the user equipment may, e.g., be configured to transmit or to receive the second kind of traffic comprising the traffic for positioning in the one or more second bandwidth parts.

In an embodiment, a bandwidth of each of the one or more second bandwidth parts may, e.g., be larger than a bandwidth of each of the one or more first bandwidth parts.

According to an embodiment, the user equipment may, e.g., be configured to receive the configuration message which specifies for a bandwidth part of the one or more bandwidth parts a general use portion of said bandwidth part (wherein the general use portion may, e.g., be smaller than said (complete) bandwidth part). The user equipment may, e.g., be configured to transmit or to receive the first kind of traffic only in the general use portion said bandwidth part. Moreover, the user equipment may, e.g., be configured to transmit or to receive the second kind of traffic comprising the traffic for positioning in the general use portion of said bandwidth part and in another portion of said bandwidth part outside the general use portion.

In an embodiment, the user equipment may, e.g., be configured to receive the configuration message which specifies for a bandwidth part of the one or more bandwidth parts a general use portion of said bandwidth part, the general use portion being smaller than said bandwidth part. The user equipment may, e.g., be configured to transmit or to receive the second kind of traffic comprising the traffic for positioning not in the general use portion of said bandwidth part, but only in another portion of said bandwidth part outside the general use portion.

According to an embodiment, the configuration message which specifies for said bandwidth part the general use portion such that the general use portion may, e.g., be assigned to a frequency range, which may, e.g., be a subportion of the frequency range of said bandwidth part.

In an embodiment, the first kind of traffic comprises user data and/or control information.

According to an embodiment, the first kind of data traffic may, e.g., comprise data (for example, a phase tracking reference signal) or control information transmitted in a physical downlink shared channel or in a physical uplink control channels or in a synchronization signal block or in a channel state information reference signal.

In an embodiment, the user equipment may, e.g., be configured to transmit an uplink positioning reference signal or an uplink sounding reference signal as the second kind of traffic.

According to an embodiment, the user equipment may, e.g., be configured to receive a downlink positioning reference signal as the second kind of traffic.

In an embodiment, the user equipment may, e.g., be configured to employ a first uplink carrier and a supplemental uplink carrier to transmit the reference signal for positioning.

According to an embodiment, the user equipment may, e.g., be configured to employ the first uplink carrier for transmitting user data or control information applicable to a supplemental uplink carrier.

In an embodiment, the user equipment may, e.g., be configured to receive the reference signal for positioning over a first carrier, and may, e.g., be configured to use said reference signal for transmitting a sounding or positioning signal in a supplemental uplink carrier.

According to an embodiment, the user equipment may, e.g., be configured to receive user data or control information over the first uplink carrier, but not over the supplemental uplink carrier.

In an embodiment, the user equipment may, e.g., be configured to receive first configuration information on a first carrier from a master node. The user equipment may, e.g., be configured to receive second configuration information on a second carrier from a secondary node via the master node. Moreover, the user equipment may, e.g., be configured to employ the first configuration information and the second configuration information for transmitting and/or for receiving the reference signal for positioning over the first carrier and over the second carrier.

According to an embodiment, the user equipment may, e.g., be configured to employ the first configuration information and the second configuration information for transmitting and/or for receiving the reference signal for positioning over the first carrier and over the second carrier.

In an embodiment, the user equipment may, e.g., be configured to transmit a sounding reference signal using the first carrier and the second carrier.

According to an embodiment, the user equipment may, e.g., be configured to employ the first configuration information and the second configuration information for receiving a reference signal for positioning over the first carrier and over the second carrier.

In an embodiment, the user equipment may, e.g., be configured to measure the received reference signal for positioning, and may, e.g., be configured to transmit a report on the measuring using LPP radio.

According to an embodiment, the user equipment is configured to transmit a capability message to the network entity indicating that the user equipment is capable to transmit an uplink positioning signal or to receive a downlink positioning signal. In response to the capability message, the user equipment is configured to receive a configuration message from the network entity, which indicates a configuration for transmitting the uplink positioning signal or for receiving the downlink positioning signal over the one or more second resources. The user equipment is configured to transmit the uplink positioning signal with a higher bandwidth than the uplink reference signal or to receive the downlink positioning signal with a larger bandwidth than the downlink reference signal depending on a configuration message from the network entity in response to the capability message.

In an embodiment, the user equipment is configured to transmit the capability message to the network entity, such that the capability message comprises information on a maximum bandwidth of the uplink positioning signal which the user equipment can support, and/or comprises information on a maximum transmit power of a positioning transmitter of the user equipment; and/or is able to continue transmission of the uplink positioning signal, if the downlink positioning signal is temporarily not available.

According to an embodiment, the user equipment may, e.g., be configured to transmit first user data or first control information with a smaller bandwidth than the uplink positioning signal, and/or he user equipment may, e.g., be configured to receive second user data or second control information with a smaller bandwidth than the downlink positioning signal.

According to an embodiment, when the user equipment may, e.g., be located in the (predefined/positioning) area, the user equipment may, e.g., be capable to derive synchronization and control information from a downlink signal in a frequency range used for the wideband signal.

In an embodiment, when the user equipment may, e.g., be located in the (predefined/positioning) area, the user equipment may, e.g., be configured to receive a downlink positioning signal, and the user equipment may, e.g., be configured to transmit measurement reports over another channel in the (predefined/positioning) area to the network entity.

In an embodiment, the reference signal may, e.g., be a downlink positioning reference signal; or may, e.g., be an uplink positioning reference signal; or may, e.g., be an uplink sounding reference signal.

According to an embodiment, a total bandwidth of the one or more second resources used for transmitting or receiving the reference signal by the user equipment may, e.g., be larger than a total bandwidth of the one or more second resources used for transmitting the configuration message to the user equipment.

In an embodiment, the user equipment may, e.g., be configured to receive the configuration message over the one or more first resources being a first set of one or more bandwidth parts. The user equipment may, e.g., be configured to employ the configuration information to transmit or to receive the reference signal over the one or more second resources being a second set of one or more bandwidth parts.

For example, the UE in RRC_INACTIVE mode, subject to UE capability, may, e.g., be expected to process DL PRS outside (and e.g., inside) of the initial DL BWP. The UE may be configured with (e.g., the same or) a different numerology and CP for PRS resources than those of the initial DL BWP for DL PRS processing outside of the initial DL BWP.

For example, subject to UE capability, the UE may, e.g., be configured with an SRS resource for positioning including frequency location and bandwidth, numerology, and CP length for transmission of the SRS in RRC_INACTIVE mode.

According to an embodiment, the user equipment may, e.g., be configured to receive in at least one of the one or more first bandwidth parts an encoded indication. The user equipment may, e.g., be configured to decode the encoded indication to determine for each of one or more uplink reference signal configurations a bandwidth part allocation as the uplink configuration information. Moreover, the user equipment may, e.g., be configured to employ the uplink configuration information to transmit the reference signal.

In an embodiment, the user equipment may, e.g., be configured to not decode the second set of one or more bandwidth parts to obtain information on one or more downlink channels (e.g., information on a physical downlink control channel and/or a physical downlink shared channel).

According to an embodiment, the user equipment may, e.g., be configured to transmit the reference signal over the second set of one or more bandwidth parts irrespective of a state (e.g., connected state and/or inactive state and/or idle state) of the user equipment with respect to the first set of one or more bandwidth parts.

In an embodiment, the user equipment may, e.g., be configured to conduct one or more measurements of the second set of one or more bandwidth parts. The user equipment may, e.g., be configured to report on the one or more measurements of the second set of one or more bandwidth parts.

According to an embodiment, the user equipment may, e.g., be configured to receive information on a downlink channel over the first set of one or more bandwidth parts. The user equipment may, e.g., be configured to receive on the downlink channel an activation or a triggering for a transmission of the reference signal. Moreover, the user equipment may, e.g., be configured to transmit the reference signal depending on the activation or the triggering.

In an embodiment, the user equipment may, e.g., be configured to obtain synchronization information from the first set of one or more bandwidth parts. The user equipment may, e.g., be configured to synchronize a transmission or a reception of the reference signal depending on the synchronization information.

According to an embodiment, the user equipment may, e.g., be configured to receive the configuration message over the one or more first resources, wherein the one or more first resources comprise two or more component carriers or comprise at least one unlicensed band.

In an embodiment, the user equipment may, e.g., be configured to receive the configuration message over the first set of one or more bandwidth parts from a first base station, wherein the configuration message indicates the second set of one or more bandwidth parts for a second base station. The user equipment may, e.g., be configured to transmit the reference signal over the second set of one or more bandwidth parts to the second base station, or wherein the user equipment may, e.g., be configured to receive the reference signal over the second set of one or more bandwidth parts from the second base station.

According to an embodiment, the user equipment may, e.g., be configured to transmit or to receive the reference signal over the second set of one or more bandwidth parts for positioning.

In an embodiment, a total bandwidth of the second set of one or more bandwidth parts used for transmitting or receiving the reference signal by the user equipment may, e.g., be larger than a total bandwidth of the first set of one or more bandwidth parts used for transmitting the configuration message to the user equipment.

According to an embodiment, for positioning the second set of one or more bandwidth parts may, e.g., be configured as one or more transmit-only bandwidth parts.

In an embodiment, the second set of one or more bandwidth parts comprises two carriers with adjacent carrier frequencies.

According to an embodiment, an orthogonal frequency division multiplex parameter configuration of the second set of one or more bandwidth parts differs from an orthogonal frequency division multiplex parameter configuration of the first set of one or more bandwidth parts at least in that a cyclic prefix length may, e.g., be different or in that a subcarrier spacing may, e.g., be different.

For example, the UE in RRC_INACTIVE mode, subject to UE capability, may, e.g., be expected to process DL PRS outside (and e.g., inside) of the initial DL BWP. The UE may be configured with (e.g., the same or) a different numerology and CP for PRS resources than those of the initial DL BWP for DL PRS processing outside of the initial DL BWP.

For example, subject to UE capability, the UE may, e.g., be configured with an SRS resource for positioning including frequency location and bandwidth, numerology, and CP length for transmission of the SRS in RRC_INACTIVE mode.

In an embodiment, the user equipment may, e.g., be configured to employ two or more bandwidth parts for transmitting or for receiving the reference signal for positioning.

According to an embodiment, the user equipment may, e.g., be configured to receive the configuration information as compressed configuration information from the network entity.

Moreover, a network entity for a wireless communication system according to an embodiment is provided.

The network entity is configured to transmit a configuration message over one or more first resources to a user equipment of the wireless communication system, wherein the configuration message comprises configuration information indicating one or more second resources.

The configuration information is suitable to be employed by the user equipment for transmitting or for receiving a reference signal for positioning over the one or more second resources.

According to an embodiment, the network entity may, e.g., be configured to receive the reference signal for positioning over the one or more second resources from the user equipment. Or, the network entity may, e.g., be configured to transmit the reference signal for positioning over the one or more second resources to the user equipment.

In to an embodiment, the configuration information may, e.g., be suitable to be employed by the user equipment for transmitting the reference signal for positioning over the one or more second resources to another network entity. Or, the configuration information may, e.g., be suitable to be employed by the user equipment for receiving the reference signal for positioning over the one or more second resources from another network entity.

According to an embodiment, the network entity may, e.g., be a base station.

In an embodiment, the network entity may, e.g., be another user equipment.

According to an embodiment, the configuration message indicates, which resources of a plurality of resources are intended to be used for wideband positioning information, by indicating that a transmission of wideband positioning information may, e.g., be allowed using two or more carriers of a plurality of carriers in one or more slots of a plurality of slots.

In an embodiment, the configuration message indicates, which resources of a plurality of resources are intended to be used for wideband positioning information, by indicating that a transmission of wideband positioning information may, e.g., be allowed using different bandwidth parts of a same carrier in one or more slots of a plurality of slots.

In an embodiment, the configuration message indicates, which further resources of the plurality of resources are intended to be used for transmitting data and for transmitting control information, by indicating that a transmission of data and control information may, e.g., be allowed using one of the two or more carriers in one or more further slots of the plurality of slots.

According to an embodiment, a bandwidth used for the transmission or reception of the wideband positioning data may, e.g., be larger than a bandwidth used for the transmission and reception of the user data or the control information.

In an embodiment, the network entity may, e.g., be configured to receive an uplink positioning reference signal or an uplink sounding reference signal as the wideband positioning information over said two or more carriers in said at least one of said one or more slots from the user equipment.

According to an embodiment, the network entity may, e.g., be configured to transmit a downlink positioning reference signal as the wideband positioning information in said two or more carriers in said at least one of said one or more slots to the user equipment.

In an embodiment, the plurality of carriers are a plurality of frequency band carriers, and the two or more carriers are two or more frequency band carriers.

According to an embodiment, the plurality of slots are a set of semi-persistent time slots configured by the network.

In an embodiment, the network entity may, e.g., be configured to receive a capability message from the user equipment, such that the capability message comprises first information on a first bandwidth the user equipment can handle in downlink and/or uplink for a first kind of traffic, and such that the capability message comprises second information on a second bandwidth the user equipment can handle in downlink and/or uplink for a second kind of traffic, wherein the second kind of traffic may, e.g., be different from the first kind of traffic, wherein the second kind of traffic comprises traffic for positioning. The network entity may, e.g., be configured to transmit the configuration message to the user equipment, wherein the configuration message comprises information on one or more bandwidth parts depending on the capability message of the user equipment.

According to an embodiment, the network entity may, e.g., be configured to transmit the configuration message to the user equipment, which specifies one or more first bandwidth parts for transmitting or receiving the first kind of data traffic, and wherein the configuration message specifies one or more second bandwidth parts for transmitting or receiving the second kind of traffic comprising the traffic for positioning.

In an embodiment, a bandwidth of each of the one or more second bandwidth parts may, e.g., be larger than a bandwidth of each of the one or more first bandwidth parts.

According to an embodiment, the network entity may, e.g., be configured to transmit the configuration message to the user equipment, which specifies for a bandwidth part of the one or more bandwidth parts a general use portion of said bandwidth part (the general use portion being smaller than said (complete) bandwidth part).

In an embodiment, the configuration message which specifies for said bandwidth part the general use portion such that the general use portion may, e.g., be assigned to a frequency range, which may, e.g., be a sub-portion of the frequency range of said bandwidth part.

According to an embodiment, the first kind of traffic comprises user data and/or control information.

In an embodiment, the first kind of data traffic may, e.g., comprise data (for example, a phase tracking reference signal) or control information transmitted in a physical downlink shared channel or in a physical uplink control channels or in a synchronization signal block or in a channel state information reference signal.

According to an embodiment, the network entity may, e.g., be configured to receive from the user equipment an uplink positioning reference signal or an uplink sounding reference signal as the second kind of traffic.

In an embodiment, the network entity may, e.g., be configured to transmit a downlink positioning reference signal as the second kind of traffic to the user equipment.

According to an embodiment, the network entity may, e.g., be configured to transmit the reference signal for positioning to the user equipment over a first uplink carrier and a supplemental uplink carrier.

In an embodiment, the network entity may, e.g., be configured to employ the first uplink carrier for transmitting user data or control information applicable to a supplemental uplink carrier.

According to an embodiment, the network entity may, e.g., be configured to transmit first configuration information on a first carrier from the network entity being a master node. The network entity may, e.g., be configured to forward second configuration information on a second carrier from a secondary node to the user equipment.

In an embodiment, the network entity may, e.g., be configured to receive an uplink reference signal from the user equipment, or to transmit a downlink reference signal to the user equipment. The network entity may, e.g., be configured to receive a capability message from the user equipment; wherein the capability message comprises information that the user equipment may, e.g., be capable of transmitting an uplink positioning signal as the reference signal and/or capable of receiving a downlink positioning signal as the reference signal. Depending on whether or not a user equipment may, e.g., be located in a (predefined/positioning) area, the network entity may, e.g., be configured to transmit the configuration message to the user equipment, which indicates a configuration for transmitting the uplink positioning signal or for receiving the downlink positioning signal over the one or more second resources. Depending on said configuration, the network entity may, e.g., be configured to receive the uplink positioning signal with a higher bandwidth than the uplink reference signal from the user equipment; or the network entity may, e.g., be configured to transmit the downlink positioning signal with a larger bandwidth than the downlink reference signal to the user equipment.

According to an embodiment, the network entity may, e.g., be configured to receive the capability message from the user equipment; wherein the capability message comprises information on a maximum bandwidth of the uplink positioning signal which the user equipment can support, and/or comprises information on a maximum transmit power of a positioning transmitter of the user equipment.

In an embodiment, the network entity may, e.g., be configured to receive first user data or first control information with a smaller bandwidth than the uplink positioning signal from the user equipment, and/or the network entity may, e.g., be configured to transmit second user data or second control information with a smaller bandwidth than the downlink positioning signal to the user equipment.

According to an embodiment, when the user equipment may, e.g., be located in the (predefined/positioning) area, the network entity may, e.g., be configured to transmit a downlink positioning signal, and the network entity may, e.g., be configured to receive measurement reports over another channel in the (predefined/positioning) area from the user equipment.

In an embodiment, the network entity may, e.g., be configured to transmit or to receive the reference signal over the one or more second resources for positioning from the user equipment.

According to an embodiment, the reference signal may, e.g., be a downlink positioning reference signal; or may, e.g., be an uplink positioning reference signal; or may, e.g., be an uplink sounding reference signal.

In an embodiment, a total bandwidth of the one or more second resources used for transmitting or receiving the reference signal by the user equipment may, e.g., be larger than a total bandwidth of the one or more second resources used for transmitting the configuration message to the user equipment.

According to an embodiment, the network entity may, e.g., be configured to transmit the configuration message over the one or more first resources being a first set of one or more bandwidth parts to the user equipment. The network entity may, e.g., be configured to transmit or to receive the reference signal over the one or more second resources being a second set of one or more bandwidth parts.

In an embodiment, the network entity may, e.g., be configured to transmit in at least one of the one or more first bandwidth parts an encoded indication to the user equipment.

According to an embodiment, the user equipment may, e.g., be configured to conduct one or more measurements of the second set of one or more bandwidth parts. The network entity may, e.g., be configured to receive a report from the user equipment on one or more measurements of the second set of one or more bandwidth parts.

In an embodiment, the network entity may, e.g., be configured to transmit information on a downlink channel over the first set of one or more bandwidth parts to the user equipment.

The network entity may, e.g., be configured to transmit on the downlink channel an activation or a triggering for a transmission of the reference signal to the user equipment.

Moreover, the network entity may, e.g., be configured to receive the reference signal depending on the activation or the triggering from the user equipment.

According to an embodiment, the user equipment may, e.g., be configured to receive the configuration message over the one or more first resources, wherein the one or more first resources comprise two or more component carriers or comprise at least one unlicensed band.

In an embodiment, the network entity may, e.g., be configured to transmit the configuration message over the first set of one or more bandwidth parts to the user equipment, wherein the configuration message indicates the second set of one or more bandwidth parts for a second base station. The network entity may, e.g., be configured to receive the reference signal over the second set of one or more bandwidth parts from the user equipment, or wherein the network entity may, e.g., be configured to transmit the reference signal over the second set of one or more bandwidth parts to the user equipment.

According to an embodiment, the network entity may, e.g., be configured to transmit or to receive the reference signal over the second set of one or more bandwidth parts for positioning to the user equipment.

In an embodiment, a total bandwidth of the second set of one or more bandwidth parts used for transmitting or receiving the reference signal by the user equipment may, e.g., be larger than a total bandwidth of the first set of one or more bandwidth parts used for transmitting the configuration message to the user equipment.

According to an embodiment, for positioning the second set of one or more bandwidth parts may, e.g., be configured as one or more transmit-only bandwidth parts.

In an embodiment, the second set of one or more bandwidth parts comprises two carriers with adjacent carrier frequencies.

According to an embodiment, an orthogonal frequency division multiplex parameter configuration of the second set of one or more bandwidth parts differs from an orthogonal frequency division multiplex parameter configuration of the first set of one or more bandwidth parts at least in that a cyclic prefix length may, e.g., be different or in that a subcarrier spacing may, e.g., be different.

In an embodiment, the network entity may, e.g., be configured to employ two or more bandwidth parts for transmitting or for receiving the reference signal for positioning.

According to an embodiment, the network entity may, e.g., be a first network entity being configured to coordinate resource allocation of one or more resources used for positioning applications with a second network entity of the wireless communication system.

In an embodiment, the first network entity may, e.g., be configured to coordinate a time interval or slot used for positioning signals (e.g., the reference signal for positioning) with the second network entity.

According to an embodiment, the first network entity may, e.g., be configured to coordinate the slot or time interval used for positioning with the second network entity using a same clock reference for synchronization.

In an embodiment, the first network entity may, e.g., be configured to coordinate with the second network entity that the user equipment is authorized to use resources operated by the second network entity.

According to an embodiment, the first network entity may, e.g., be configured to coordinate procedures for power control and interference mitigation that apply when signals are transmitted within a wideband positioning slot with the second network entity.

In an embodiment, the network entity may, e.g., be configured to transmit the configuration information as compressed configuration information to the user equipment.

A wireless communication system according to an embodiment is provided.

The wireless communication system comprises a user equipment according to one of the above-described embodiments and a network entity according to one of the above-described embodiments. The user equipment is configured to receive, from the network entity or from another network entity, configuration and assistance data comprising information on a plurality of resources of a wireless communication system.

In the following, some explanations to obtain a better understanding for embodiments of the present invention are provided.

Support high signal bandwidth provides a high data rate for communication applications and increased accuracy for ToA (time of arrival) based positioning applications. For many applications a low bitrate is sufficient, whereas a precise localization is important.

Accordingly, an efficient implementing of high bandwidth for positioning purpose would be highly appreciated.

Supporting a high bandwidth can be implemented in different ways. If the sub-carrier spacing is kept, a higher bandwidth entails a higher FFT length.

According to a first approach, if the UE is a NB-IoT (NB=narrowband) the wideband signal can be calculated in advance and stored in a memory, for example. Only the DAC and RF-chain must support the higher bandwidth. A second approach is that a bandwidth used exceeds the capability of the numerology currently supported by the 5G standard (e.g., a 8K FFT is introduced). According to a third approach, two modulators or demodulators work in parallel. A fourth approach is to employ a sequential transmission, switch of the center frequency of the RF-chain. This may make a coherent demodulation not feasible.

The numerology of 5G supports higher bandwidth by increasing the sub-carrier spacing. But increasing the sub-carrier spacing reduces the symbol duration and cyclic prefix length. Regarding an uplink sounding reference signal (UL-SRS), this results in higher accuracy of the timing advance setting, but a lower distance of the gNBs is used to ensure that the CP length is sufficient to cover the ToA offset caused by different distances. Regarding the downlink positioning reference signal (DL-PRS), CP length may be not sufficient causing (non-orthogonal) interference between DL-PRS emitted from different gNBs.

Embodiments achieve that if the device is a low-power NB-IOT device the power consumption related to positioning procedures and the additional complexity associated to hardware supporting higher bandwidth is minimized.

In an embodiment, a UE may, e.g., be able to receive (and process) a limited bandwidth. For the full bandwidth the UE is a transmit only device and only for a limited bandwidth the UE is a capable of bi-directional communication.

According to some embodiments, a numerology used for positioning may, e.g., be different from a numerology selected for communication. For example, the OFDM parameters are selected according to different criteria, and/or numerologies considered for FR2 may be also used for FR1.

In an embodiment, operational rules (for example, power control, timing advance setting) for PRS may be different For the positioning of a UE of NB-IoT devices, ECID which was introduced in the Rel. 14 for the NB-IoT may be used, or OTDOA which was also introduced in the Rel. 14 for NB-IoT and which uses narrowband positioning reference signals may, e.g., be employed.

Likewise, for positioning of eMTC type devices, the OTDOA and UTDOA functionalities of LTE may be used.

Nevertheless, the narrow 1.4 MHz signal used for category M1 limits the achievable positioning accuracy.

Some embodiments enable a UE capable of transmitting and/or receiving positioning signals for positioning beyond the UE communication capabilities or other usage.

In embodiments, a positioning-RS with larger bandwidth than that assigned for bidirectional data communication may, e.g., be employed.

According to an embodiment, transmitting and/or receiving a positioning-RS may, e.g., be conducted during a communication usage inactive or idle state.

In an embodiment, a device supports a first technology for communication (such as NB-IoT, etc.) and a second technology for positioning, being different from the first technology.

Some embodiments may, e.g., be employed for downlink, DL, and uplink, UL, signal based positioning. For example, a UE may comprise a separate narrowband and wideband transceivers, such as:

- Narrowband UL/DL+Wideband UL positioning signal transmission; or
- Narrowband UL/DL+Wideband DL positioning signal reception; or
- Narrowband UL/DL+Wideband positioning signal reception (both UL and DL), but the wideband transceiver may be active during a limited time only.

According to an embodiment, a UE may, for example, open up a wider bandwidth momentarily for transmitting and/or receiving positioning signals.

For example, in some embodiments, a UE may use this larger bandwidth for a dedicated time interval only. This time-interval may, e.g., be referred to as WPS (Wideband Positioning Slot), PR (positioning resources) or PS (Positioning Slot).

According to some embodiments, in line with the bandwidth part (BWP) concept of 5G, a WPS, or PR or PS may, e.g., be transmitted during a time-interval defined by the RRC (radio resource control) procedures. The network entities in charge of the radio resource management may coordinate the time interval used for positioning signals.

In some embodiments, within the WPS, or PR or PS, different procedures for power control and interference mitigation may, e.g., apply, while the signals transmitted within the WPS may, e.g., be standard-compliant.

In other embodiments, signals not yet defined by the 4G/5G standard may be transmitted within the WPS. For example, signals may, e.g., be designed according the requirements of positioning applications.

According to an embodiment, for the WPS, or PR or PS another carrier frequency may, e.g., be used. For example, in this complementary frequency band the UE may be a transmit only device or a receive only device. In an embodiment, a time scheduling and synchronization for this complementary (secondary) frequency band may, e.g., be derived from a primary frequency band also used for communication purpose. Examples for possible combinations are:

- FR1 is used as primary band, FR2 as secondary,
- FR1 is used as primary band, an unlicensed band (WiFi band, for example) is used as secondary band,
- FR1 is used as primary band (and for this band a large coverage area is provided), whereas for the WPS a frequency is used authorized locally only,
- NB-IOT band (e.g. signal in 4G band with low bandwidth) and high bandwidth in a 5G-NR band.

In some embodiments, a bandwidth of the WPS may occupy a bandwidth of two or more (for example, adjacent) carriers. For example, each carrier may, e.g., use an independent RRC and may be operated by a different operator. The carriers may, e.g., be synchronized, for example, to a same clock reference. This allows that the RRC entities coordinate a slot for positioning purpose and authorize the UE to also use the bandwidth of the other operator.

According to some embodiments, for management and control a reduced bandwidth is used, while for the full bandwidth the UE may be a transmit only device.

In an embodiment, the synchronization for transmitting the PRS may, e.g., be derived from a signal in a reduced bandwidth. According to an embodiment, several UEs may, e.g., share the same slot and separated using different COMB offset and/or different sequence and/or different cyclic shift.

According to an embodiment, a carrier may, e.g., use a higher bandwidth. For example, using the configurable bandwidth parts (BWP), e.g., of the 5G standard, for a positioning purpose, a transmit only BWP may, e.g., be configured, while for management, control and synchronization only a lower bandwidth may, e.g., be employed.

In an embodiment, a second carrier is may, e.g., be associated to the carrier used for management and control. This second carrier may, for example be either a SUPL (supplementary Uplink) or another frequency band (e.g., FR2).

According to an embodiment, the allocation of position slots may, e.g., be coordinated between different carriers. For example, two adjacent carrier frequencies are aggregated and used for wideband transmission.

In the following, carrier aggregation according to embodiments is described.

According to some embodiments, several (two or more) carrier may, e.g., be used.

In some embodiments, a carrier may be "owned" by one operator or shared with several operators.

According to an embodiment, the RRCs for each carrier are independent, but at least partly synchronized (e.g. common framing).

In accordance with an embodiment, the RRCs for the different carrier may, e.g., coordinate the time slot for a WPS.

In an embodiment, in case of a non-ideal synchronization the WPS may, e.g., include a guard times at the beginning and end of the WPS Now, UL-TDOA (uplink time difference of arrival) (or UL measurements for round trip time, RTT) is considered.

Several operators (or an operator using several carrier) share gNBs. All gNBs related to a positioning area are shared, or a subset is shared only. The other gNBs may demodulate one carrier only.

The carriers are synchronized in time. Using timestamps (e.g. frame and slot number) allows to define a slot used for wideband positioning signals.

In an embodiment, the UE has the capability to generate an uplink signal with a bandwidth covering the spectrum allocated to the two (or more) carriers.

The gNBs (or a subset of the gNBs) can coherently demodulate the signals of the spectrum related to several carriers by using fully synchronized demodulators for each carrier or a wideband demodulator.

For which time slot the UE is enabled to transmit a signal exceeding the bandwidth of the active carrier (e.g., a carrier used for exchange of management and control information) is coordinated between the management entities (RRM) of the related carriers. For example, the RRMs coordinate a time slot (WPS) used for positioning reference signals (PRS, for UL-TDOA this may be a wideband SRS). Several UEs (UEs assigned to the one operator or UEs assigned to several operators) may share this slot. The 5G standard supports several methods to separate the UEs sharing the same slots, which may, e.g., be employed. For this slot, simplified power control (PC) and timing advance (TA) procedures may apply.

Figure 2:
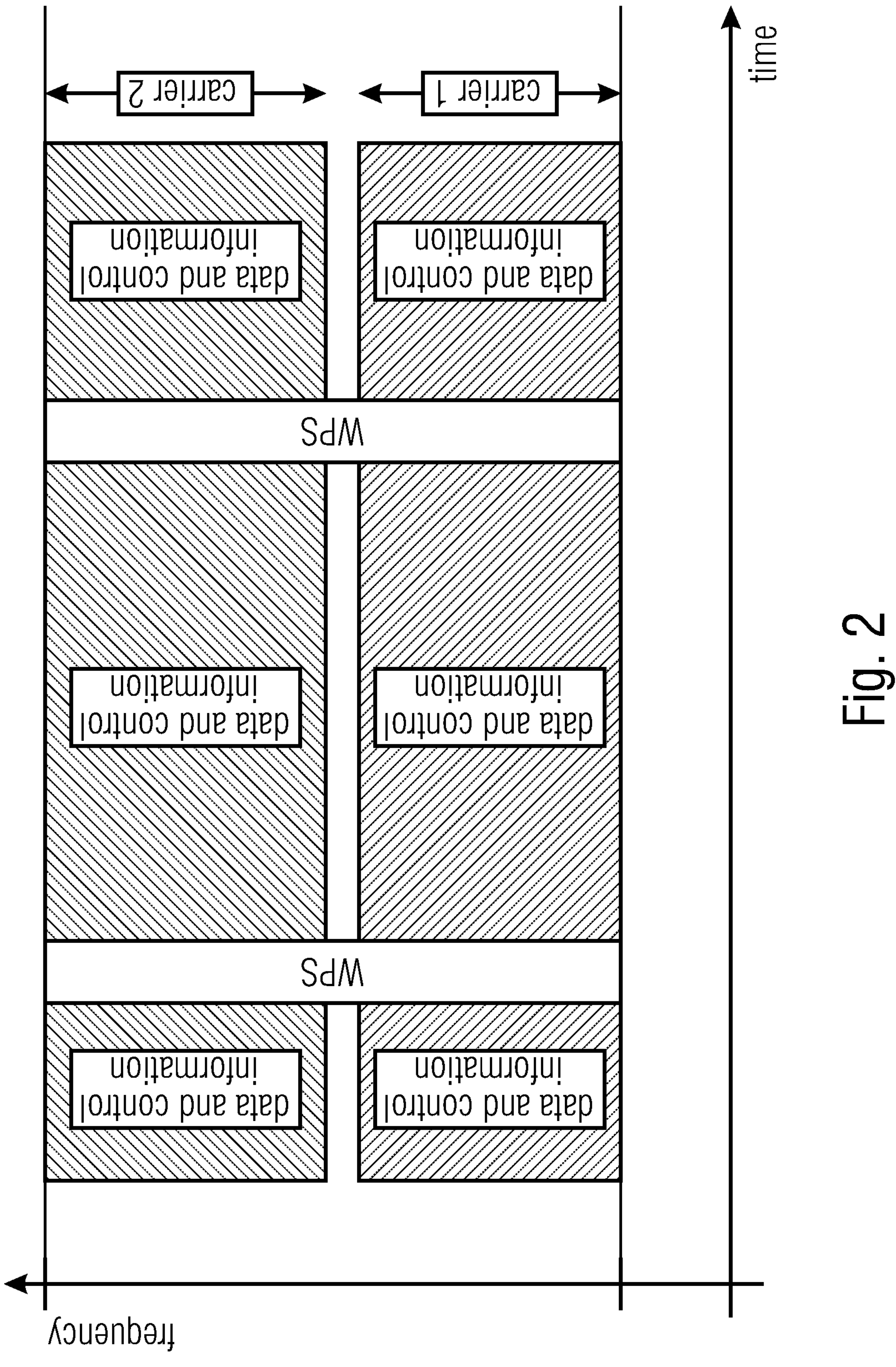
FIG. 2 illustrates a wideband positioning slot using two adjacent carriers.

FIG. 2 illustrates a wideband positioning slot using two adjacent carriers.

Regarding DL-TDOA (or DL measurements for RTT), the concept of the wideband positioning slot coordinated between carrier can be also used for downlink with the following differences that a UE not capable to receive the full bandwidth may decode a lower bandwidth only.

Some of the gNB (e.g. gNBs related to neighboring cells) may use one carrier only.

In the following, a usage of the bandwidth part adaptation feature of the NR according to embodiments is described.

As already noted above, the devices that use high bandwidth for positioning accuracy may use significantly lower bandwidth for data communication. A high-end UE may be able to dynamically adjust its bandwidth and use a smaller bandwidth part for data communication and use higher bandwidth for positioning.

Figure 3:
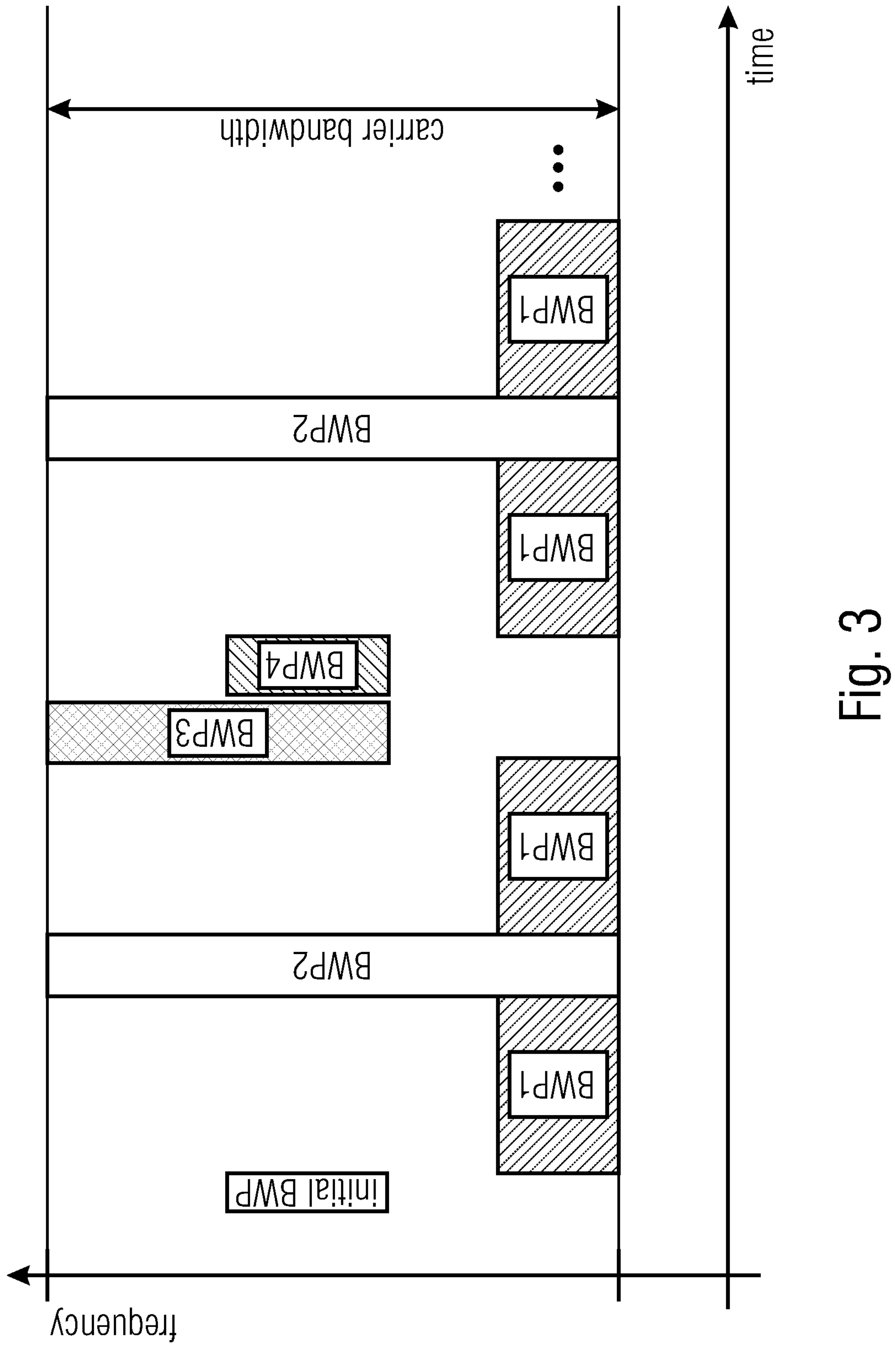
FIG. 3 illustrates a flexible bandwidth part of the 3GPP standard.

FIG. 3 illustrates a flexible bandwidth part of the 3GPP standard.

A UE can be configured with up to four BWP each for uplink, downlink and supplementary uplink according to the Rel. 16 of 3GPP (see TS 38.331). Only one bandwidth part each can be active per carrier in uplink or downlink. The active bandwidth part may be switched through network signaling. The network indicates BWP switching to the UE by sending signaling in form of device control information (DCI) through the PDCCH According to the Rel. 16 of the standard, the active BWP may be switched using sending a downlink signaling in the form of device control information (DCI). Furthermore, an inactivity timer can be set which reverts the active bandwidth part to the default bandwidth part or initial bandwidth part (if default is not configured). Moreover, there is also a mechanism for switching a bandwidth part by RRC signaling by initiating a random access procedure on the active bandwidth part if there are RACH resources configured.

In example above, it is assumed that the UE is configured for four BWP—BWP1 to BWP4 after the first bandwidth part is configured by RRC reconfiguration. A UE with low data rate may, e.g., be configured with a small bandwidth part, for example BWP1, and a larger bandwidth part BWP2 (which in this example, spans the whole carrier bandwidth).

The current mechanism, has drawbacks: For example, with respect to a DL PRS measurement or an UL-SRS transmission, the UE needs to switch to BWP2 before it can receive the DL PRS. The UE keeps BWP2 active for the entire positioning session, which increases the processing load on the UE. The UE may, e.g., switch frequently between BWP1 and BWP2. During the switch, the UE is not expected to transmit or receive anything on the BWP where the switching occurs according to TS 38.533 during the switching time which lasts at least 1 ms.

Moreover, the UE needs to be configured with a larger bandwidth part (BWP2) for the entire positioning session. The UE has to monitor PDCCH and PDSCH on the entire configured bandwidth. The size of CORESET is determined by the network and signaled to the UE. The UE may be scheduled to transmit larger codewords in PUSCH.

Rel. 16 of the standard allows UE to signal the supported channel bandwidths for a band in both uplink and downlink mode. However, it does not allow signaling a support of different bandwidths in uplink and downlink.

In an embodiment, during the capability signaling, the UE signals the network the bandwidth the UE can handle in the downlink and the bandwidth it can handle in the uplink for different band combination. Additionally, the UE signals the bandwidth combination it can handle for the positioning use.

According to an embodiment, the bandwidth combination the UE can handle for positioning use may, e.g., be either specified separately for uplink and for downlink or the same setting for the uplink and downlink combination. Different capabilities on bandwidth for positioning can be signaled for uplink and downlink. By signaling two different capabilities, the UE can signal the network that it has limited capability to process data and signaling information but it is capable of transmitting and/or receiving reference signals for positioning purposes over a wider bandwidth.

Based on the capability signaling from the UE, the network understands that the UE has different processing capability for positioning and for the rest of communication and signaling purposes (other than positioning).

In an embodiment, the feature of using capability signaling bandwidth processing capability may be used by the UE to conserve power even if the UE itself may be able to process and/or transmit signal on the bandwidth.

According to another embodiment, the UE may, e.g., actually have different processing and/or transmission capabilities for different bandwidths.

In an embodiment, the network may, e.g., use the capability signaling from the UE and adapt the bandwidth part, downlink resource allocation, uplink transmission grant, reference signals according to the specified capability.

Examples of network behavior according to embodiments for the case the UE reports different capabilities for positioning and other usage (e.g. data communication) are provided in the following.

For example, according to an embodiment, an adaptation of an active bandwidth part and a search space is conducted.

Figure 4:
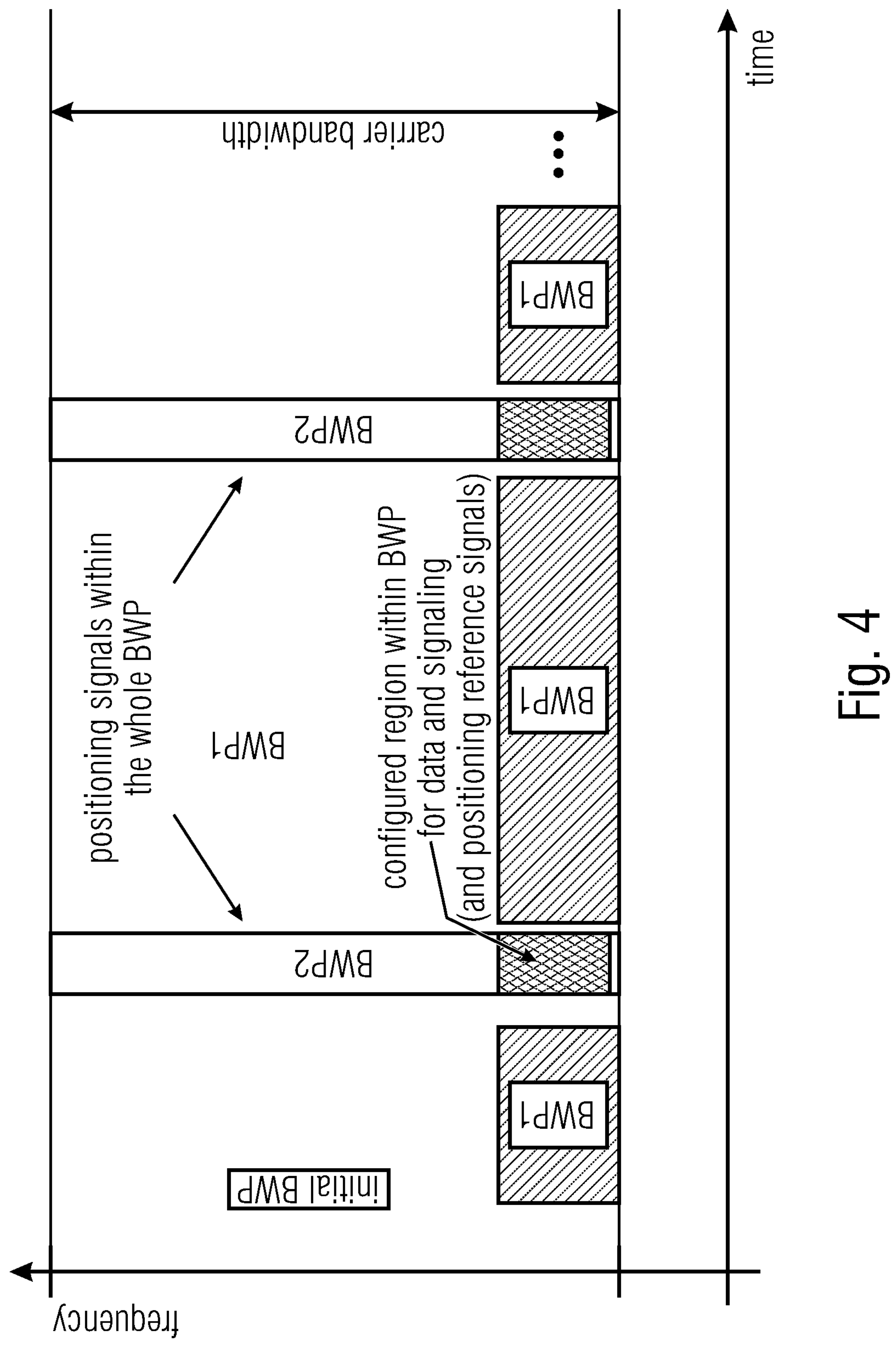
FIG. 4 illustrates a bandwidth part adaptation for positioning.

The concept of adaptation of bandwidth part and search space is explained using FIG. 4. FIG. 4 illustrates a bandwidth part adaptation for positioning.

In FIG. 4, only two BWPs are shown for clarity. For example, a UE may be configured with up to four BWP in any direction. In the example of FIG. 4, BWP1 is intended for data communication and signaling and BWP2 is intended for transmitting and/or receiving positioning reference signals depending on uplink and downlink respectively.

The network may, e.g., switch the active BWP to BWP2 when the network expects it to transmit and/or receive the positioning reference signal. In the uplink, the network provides scheduling grant not larger the size indicated in the UE capability for general use. For the downlink, the CORESET is placed within the bandwidth indicated by the UE for general use.

Furthermore, the network does not schedule a UE outside the bandwidth the UE has indicated for general use in the UE. However, for positioning, the network configures the SRS to span the bandwidth less than or equal to the size of the BWP2. Likewise, the network can configure the UE to measure the DL-PRS scheduled on the RE located anywhere within the BWP.

According to an embodiment, restriction signaling within the active bandwidth part is conducted to achieve a higher bandwidth for positioning signals only.

Similarly to the case described above, the UE is configured with a BWP, for example, BWP1 after initial access. The UE may, e.g., be signaled two regions: a general region and a special region. In the general region in the downlink, the UE is expected all channels and reference signals, such as PDSCH, PUCCH, SSB, CSI-RS, PTRS, etc. In the special region, the UE is expected to make measurements on PRS only. The PRS may be located either exclusively within the special region of the BWP or the PRS may extend both into the special region and the general region.

Figure 5:
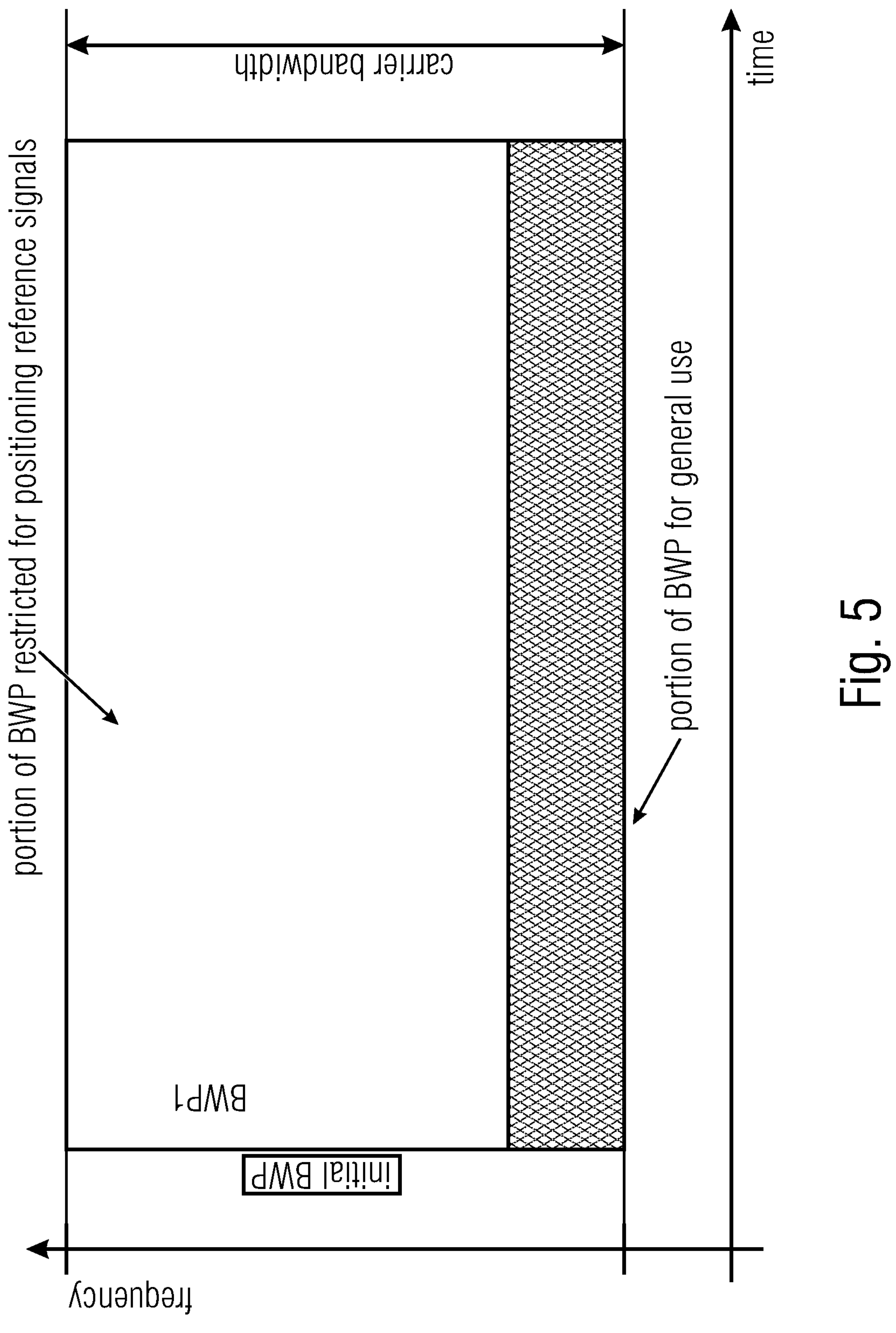
FIG. 5 illustrates a bandwidth part with a portion for general use and a portion for positioning purpose.

FIG. 5 illustrates such a bandwidth part with a portion for general use and a portion for positioning purpose.

Likewise, in the uplink, the UE is expected to transmit PUSCH with a code block size supported by the size of the general region and also the uplink control signals. In the special region, the UE is expected only to transmit positioning reference signal, for example, uplink SRS or any other reference signals that may be used for positioning.

For the special region a time scheduling may, e.g., be provided to simplify the implementation. The UE capability may allow the use of a higher bandwidth for a short time interval only.

Figure 6:
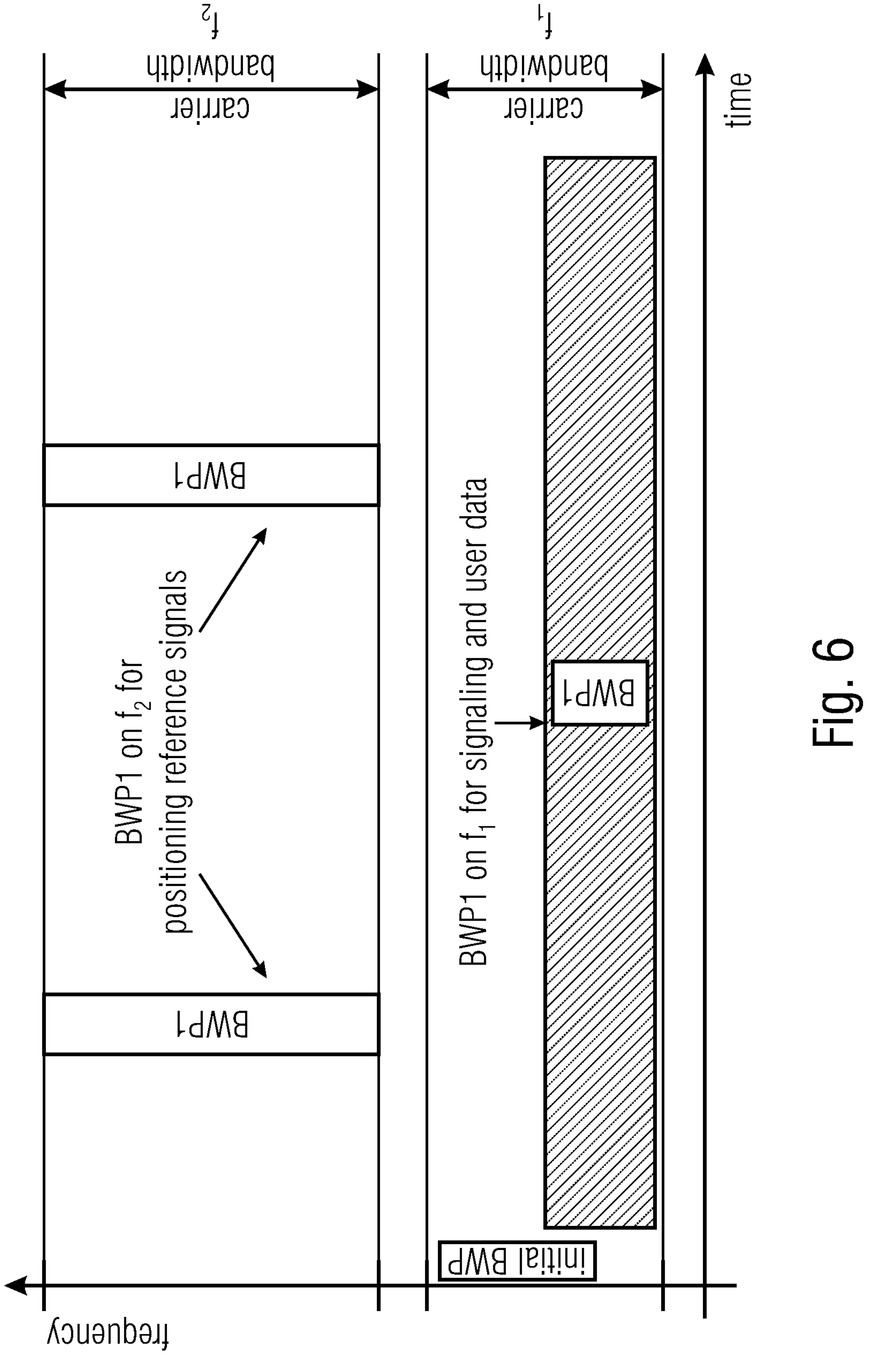
FIG. 6 illustrates cross scheduling.

In the following, carrier aggregation with cross scheduling according to embodiments is described with reference to FIG. 6, which illustrates cross scheduling.

The bandwidth part (possibly narrowband) for general use may, e.g., be configured on BWP1 on carrier frequency $f_1$ and the bandwidth part BWP1 on carrier frequency $f_2$ can be configured on carrier frequency $f_2$. The carrier frequency $f_1$ and $f_2$ may be contiguous carrier bandwidth or may be separated by guard interval on the same band. Alternatively, they may also be in different bandwidths. The narrower band, for example, may be placed on lower frequency bands to achieve better coverage for data and reliability, whereas the wider bandwidth for may be placed on the higher bandwidth for enhanced positioning.

The general region may be configured on BWP1 on carrier frequency $f_1$ and the special region may be configured on BWP1 on carrier frequency $f_2$. In each band, up to four BWP can be configured but this example only serves to show how two active BWP can be used to achieve narrowband signaling and wideband positioning.

To this effect, the carrier on carrier bandwidth $f_2$ is not assigned PDCCH on the SCell. SRS on $f_2$ is, for example, then requested by means of cross-carrier scheduling with the Carrier Indicator Field (CIF) on the PDCCH transmitted on BWP1 of $f_2$ set to indicate carrier frequency $f_2$. Thus the UE knows that it needs to receive SRS on $f_2$. For the downlink, the LPP message containing measurement request on BWP1 on $f_2$ between LMF and UE may be transparently sent to the UE over the physical resources contained in the active BWP (here BWP1) of carrier bandwidth part $f_1$.

Regarding, the supplementary uplink carrier, a higher bandwidth part may be activated on the carrier frequency corresponding to the SUL and this may be used for transferring positioning reference signal in the uplink.

With respect to dual connectivity, the MN (master node) controls radio resources in carrier frequency $f_1$ and the SN (secondary node) controls the radio resources in carrier frequency $f_2$. In the dual connectivity mode, the RRC PDUs generated by the SN can be provided either via MN or via SN.

To ensure the narrowband wideband operation, the UE needs to signal the capability that it is not able to receive or send PDUs over the SN but only receive and send positioning reference signals. The network routes the RRC PDUs at least over the MN.

For the downlink based positioning, the DL Measurement request may be made via the MN by specifying the positioning frequency layer.

For the uplink, the UE needs to transmit the SRS towards the cells in SCG. The SN, therefore, needs to provide the SRS configuration to the MN which transmits the RRC message transparently to the UE.

There may be synchronization between PCell and PSCell or at least slot level synchronization.

The timing advance commands, power adjustment commands for the SRS can be sent via the DCI from the PCell, where the CRC of the DCI is scrambled with PS-RNTI. The DCI scrambled with PS-RNTI can be used to activate the SRS for positioning in the NR-DC scenario.

In the example procedure below, the general functionality of UE is carried out with the cell or cells in the master cell group (MCG) and transmission and/or reception of positioning reference signals is carried out with one or more cells in the secondary cell group (SCG).

In the example procedure below, only PCell and PSCell are mentioned to explain the concept in a non-limiting sense.

In an embodiment, a procedure using one or more or all of the following steps may, e.g., be conducted:

1) The UE indicates the support of dual connectivity for positioning purposes to the network, wherein the link for dual connectivity may have enhanced capabilities for positioning but reduced capabilities for general use of the UE.
2) The RAN node hosting the primary cell of the MCG sends a request to a second RAN node, requesting the addition of the secondary node for a UE. The request consists at least one of the following:
    a. UE capability indicating different bandwidth capability for the RAT of the SCG receiver/transmitter.
    b. UE capability indicating reduced or no data transmission capability in the SCG.
    c. UE capability for wideband positioning signal in the SCG in uplink/downlink or both.
3) The SCG receives SRS configuration request or PRS configuration request either from LMF or from RAN node hosting MCG
4) The SCG configures SRS for the UE and provides configuration back to the MN or the LMF and provides the SRS configuration for the UE and/or the SCG confirms the DL-PRS configuration and provides DL-PRS configuration to the LMF.
5) The LMF provides the LPP message to the UE requesting measurement on the positioning reference signals (downlink positioning reference signal configuration), or the SCG sends SRS configuration to the UE using the MCG signaling bearer or split SRB (uplink positioning reference signal configuration).
6) For the uplink positioning method:

The UE begins to transmit the SRS according to RRC configuration provided in the active bandwidth part.

For downlink positioning method:

The UE measures the configured downlink positioning method and sends the measurement report using LPP using radio resources of the MCG.
7) For uplink positioning method:

If the UE is configured with semi-persistence and/or aperiodic SRS resources by the SCG, the UE receives DCI scrambled with PS-RNTI to trigger aperiodic SRS resources or via the triggering using the MAC-CE. The MAC-CE messages are generated by the SCG but transported to the UE via the MCG.

8) The UE may be provided with control commands such as TA, power adjustment and so for the radio link to SCG via DCI and/or other control channels and/or signaling via the MCG.
9) The MN may send SN release request at any time during or after the positioning session to end the dual connectivity between the radio links supporting general UE usage on narrowband and wideband positioning signal transmission on the secondary link.

In the following, using a WPS in a "positioning area" only according to embodiments is described.

Usually, a large area is served by a NB carrier (primary band). In this area a lower positioning accuracy may be acceptable.

However, within a "positioning area" (e.g. an industrial area) a higher accuracy shall be achievable. UEs in this area are commanded to transmit also a WPS.

For the WPS another carrier frequency (secondary band) may be used. For example, for the secondary band the UE may be a "transmit only" device. The synchronization for transmission in the secondary band may, for example, be derived from the primary band.

In a particular application example, the higher bandwidth is offered for indoor application only. In this particular application example, for outdoor a lower accuracy or other technologies (e.g. GNSS based technologies) may, e.g., be employed.

Figure 7:
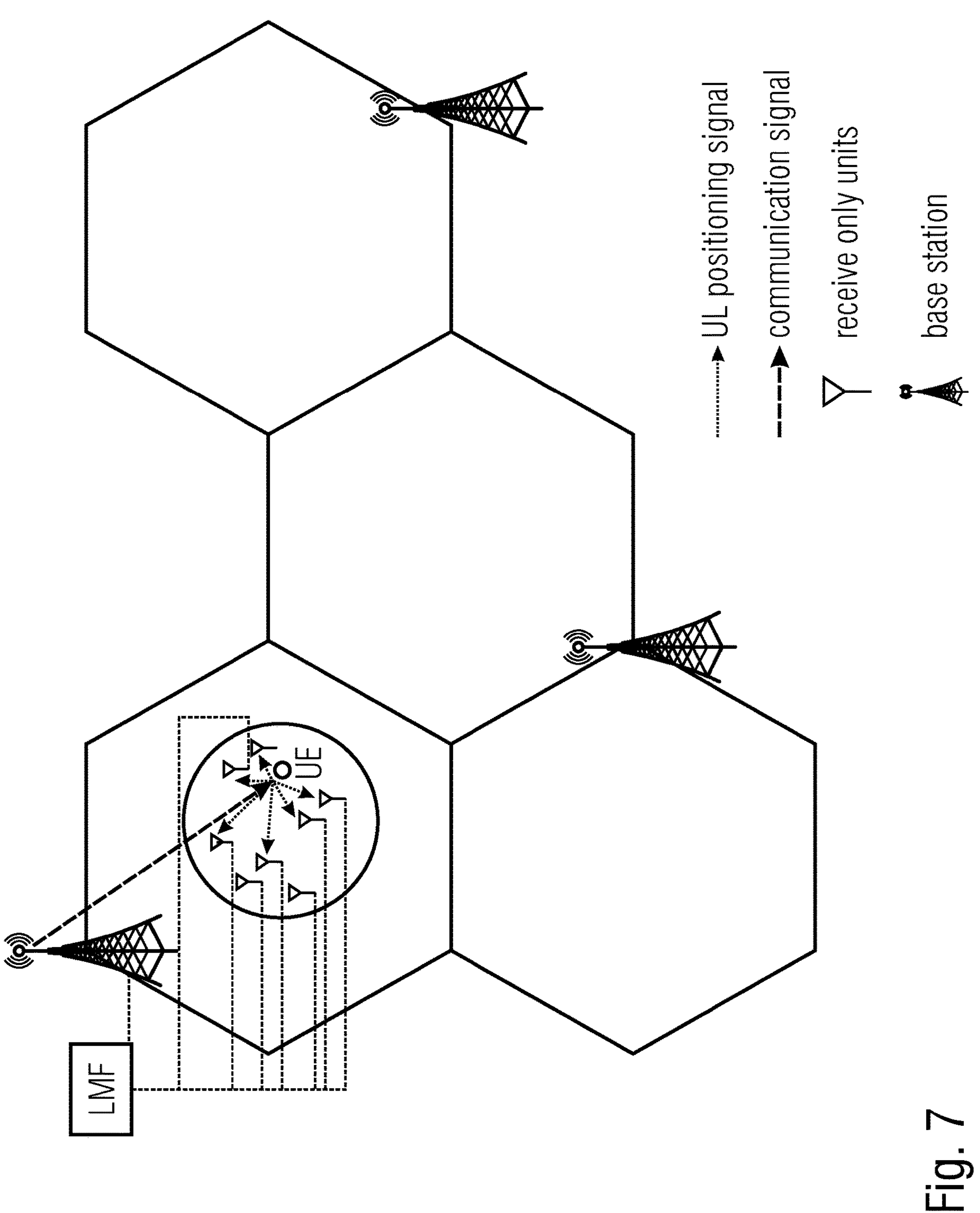
FIG. 7 illustrates uplink positioning with narrowband communication and wideband positioning signal.

The aforesaid scenario is depicted in FIG. 7, where the UE is RRC connected to its serving gNB (macro gNB) using a smaller bandwidth than that available for positioning purposes.

In particular, FIG. 7 illustrates uplink positioning with narrowband communication and wideband positioning signal.

The serving gNB configures and commands the UE to transmit a positioning signal with its associated transceiver having a wider bandwidth. This positioning signal is received by network entities which can at least receive the uplink positioning signal transmitted by the aforesaid UE.

In an embodiment, a procedure using one or more or all of the following steps may, e.g., be conducted:

1) The UE informs the serving gNB that it is capable of transmitting uplink positioning signal over a wider bandwidth than its normal data communicating capabilities. The information transmitted over the capability message may, for example additionally include, e.g., a bandwidth of the UL positioning signal it can support, and/or a maximum transmit power of the positioning transmitter.
2) Using the NB signal a coarse position estimate may be derived for the UE. This information can be used to detect that the UE is in a positioning area.
3) If the UE enters a "positioning area" (=area in which a higher accuracy is offered by the RAN technology), the network may configure the UE to transmit or receive signals in the WPS.
4) For the WPS, the UE may, e.g., be a receive-only or a transmit-only device. Hence, for all data exchange with the network the NB carrier may be used.
5) The NB and WB carrier are at least synchronized in framing. This allows to derive the time scheduling for the WB signal from the NB signal.
6) To avoid critical interference the WPS may be used for positioning signal only. This simplifies the interference mitigation technologies (power control etc.).
7) The network may include at least 3 entities, namely TRPs/gNBs for a NB signal, TRPs/gNBs for a WB signal and a LMF. These three entities may exchange coordination information among each other, including that the NB-gNBs may provide information to the LMF sufficient for the coarse position estimates for the UE; and in that the LMF may command the NB-gNBs and WB-gNBs to prepare "high accuracy positioning operation".

If not yet active the LMF may request from the WB-gNBs the scheduling of a WPS. The WB-gNBs will provide the information on the WPS (timing and use frequency resource) as well as available unused resources (sequences, COMB offset, etc.). The LMF may coordinate with the WB-gNBs a new resource to be assigned to the UE. The LMF may provide through the NB-gNB the configuration information of the WPS signals to be transmitted or received by the UE using the LPPa or NRPPa protocol or directly to the UE by the LPP protocol.

Figure 8:
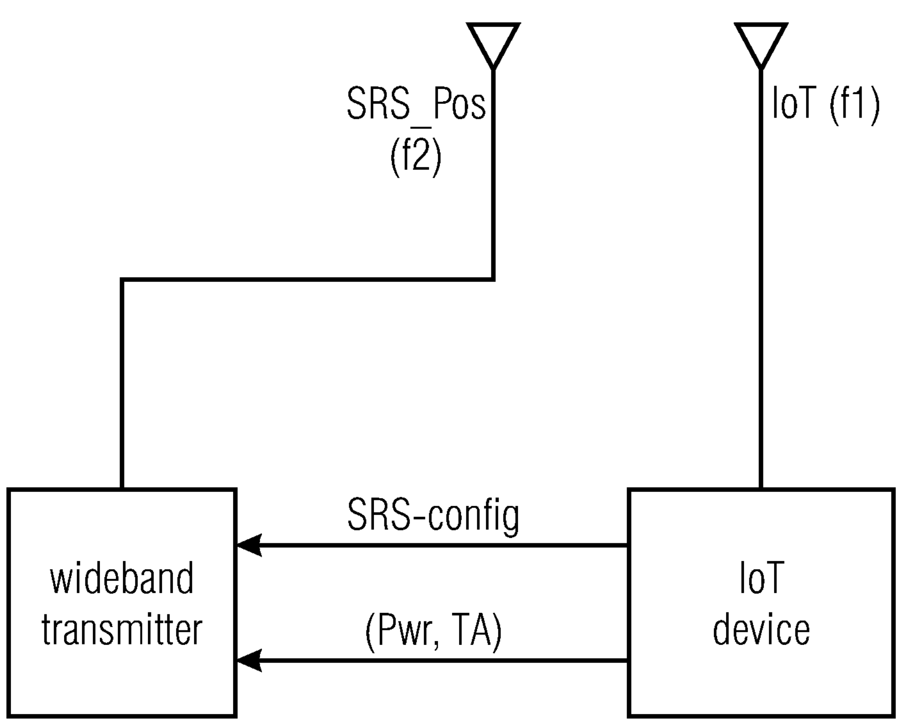
FIG. 8 illustrates a narrowband IoT device and a wideband positioning receiver combination.

Now, an UL-TDOA example according to an embodiment is considered, where the UE is for WPS a transmit only device. Reference is made to FIG. 8 which illustrates a narrowband IoT device and a wideband positioning transmitter combination. In particular, FIG. 8 illustrates a transmission of SRS (uplink positioning reference signal) on a carrier different to data communication.

It should be noted that the narrowband part of the IoT device may potentially include NB-IoT device, where the size of RRC messages is extremely limited. Hence for the application scenario considered, it becomes necessary to restrict the subset of SRS parameters allowed. This can be achieved by restricting different bandwidth and starting positions options, and/or directly configuring the root-sequence, and/or defining a small subset of hopping patterns, and configuring sequence/group hopping directly from a subset of patterns, and/or restricting time instants where the positioning signals can be transmitted The predefined restrictions can be defined as a part of a look up table and the index to the table can be signaled to the UE, either via RRC or via LPP.

The gNBs may send other network nodes (gNBs and related TRPs) that potentially schedule UEs for data communication on the frequency where the UE is scheduled to receive a positioning signal, a multi-level indicator, which may, for example, signal the other gNBs that it is intending to receive a positioning signal on a certain slot; and/or the vitality score of the signal. If a higher score is received, the target gNB receiving this index needs to keep quiet (mandatory) and a lower score is informational.

Figure 9:
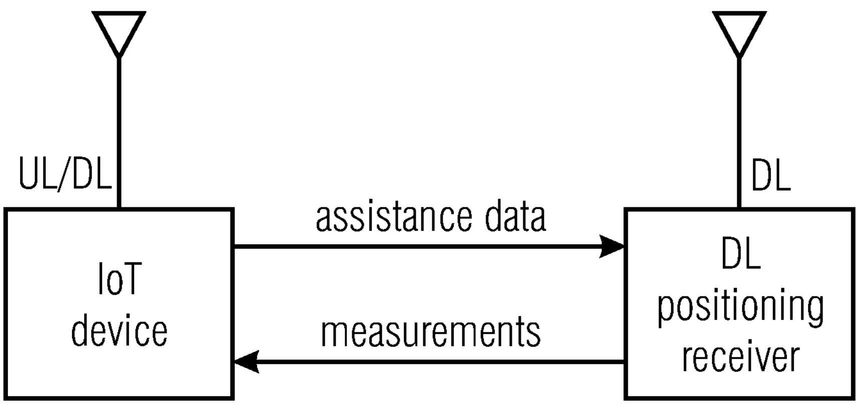
FIG. 9 illustrates narrowband communication and wideband positioning.

Now, DL-TDOA (OTDOA) example according to an embodiment is considered, where the UE is for the WPS a receive only device. Reference is made to FIG. 9, which depicts a narrowband IOT device and a wideband DL positioning receiver combination. In particular, FIG. 9 illustrates narrowband communication and wideband positioning.

In this example, the UE signals its serving gNB its capability to receive wideband positioning. The gNB provides assistance data to the positioning receiver through the IoT device to enable it to make measurement on a wider bandwidth. The serving gNB interacts with the LMF to obtain parameters for the TRPs that transmit positioning signals and convey this information. The measurement made may be forwarded to the serving gNB via the narrowband carrier or the measurement may be used for UE-based positioning, if supported.

Now, an example according to an embodiment is considered, where the UE also comprises a wideband transceiver.

The RF part (including ADC and DAC) of such a UE may, e.g., support the transmit and receive for a higher bandwidth, but the digital part may, e.g., be simplified (e.g. all processing is done in software and no dedicated hardware for processing of wideband signals is available). This may introduce a higher processing latency.

If the WPS is a pre-scheduled slot (periodic or semi-persistent allocation), this latency can be taken into account for the synchronization and signaling. This may even allow that the UE exchanges data in the WB carrier. The UE may be similar to DRX (discontinuous receive) receive data in a predetermined time slot only. It may be possible to derive the time of this slot from the NB carrier, e.g. the UE receives assistance data for processing of the WB signal through the NB signal, for example. Alternatively the UE may perform an initial scan.

This embodiment may be attractive for SDR implementations not supporting all latency and throughput requirements of a full operation in the WB carrier Nevertheless, this UE category is capable of performing uplink transmissions and downlink measurements. The UE signals to the serving gNB that the attached transceiver can send and receive positioning signals. It takes assistance data or configuration data obtained via the narrowband communication channel for positioning using the signals occupying wider bandwidth. Additionally, the measurement obtained in the downlink can be used for computing power control and helping refine timing advance to the positioning network.

If a NR UE has data capability of a smaller bandwidth part and a larger bandwidth for the positioning part, then such capability signaling can be conveyed to the gNB. At least two BWP can be configured for the UE, the larger BWP exclusively for positioning purposes by RRC signalling. The larger BWP can be triggered by DCI for the duration of positioning, and immediately thereafter switched to the default bandwidth part. The time-out duration can be configured to match the SRS or positioning configuration, and the UE should revert back to the default bandwidth part.

Alternatively, supplementary uplink can be used for transmitting a positioning signal. Currently supplementary uplink entails MSG1 and MSG2 to be transmitted on the same carrier for RACH. This needs to be relaxed, if supplementary uplink concept is to be used for positioning signal.

Now an example according to an embodiment is described, which conducts a compression of configuration data:

A capability is reported indicating a BW used for SRS (Number of 5 MHz blocks). In an example, sending of '10' means use 10 MHz less than bandwidth reported in capability.

A transmission comb offset and/or comb size may, e.g., be conducted.

SRS index pattern of 'k' patterns, pattern length is conducted.

| Pattern index | Root sequence pattern |
|---|---|
| 1 | 1, 3, 7, 9, 10 |
| 2 | 11, 13, 19, 21 |

If pattern 1 is signaled, then on the first SRS instance, root sequence 1 is used, on repetition root sequence 3, 7, 9, 10 are used sequentially until maximum repetitions is reached.

If pattern 1 is signaled and repetition is not turned on, then the same sequence is used until maximum repetitions is reached.

A small number of patterns is defined, to keep the signaling overhead over narrowband.

In the following, further embodiments of the present invention are provided.

In an embodiment, at least two BWPs assignments are conducted, wherein at least a first BWP is for configuring the configuration/assistance information providing information on at least a second BWP.

In accordance with embodiments, a method performed by a user equipment, UE, is provided, which comprises:

Receiving a configuration message over a first set of BWP(s), the configuration message including information for the transmission of an UL-RS and/or reception a DL-RS. And:

Applying the configuration message for the transmission of one or more UL-RS(s) and/or reception a DL-RS(s) at least over a second set of BWP(s).

Regarding the first set of BWP(s), in an embodiment, the UE may receive on a BWP from the first set a DL channel including one or more higher layer configuration(s) from a network entity or a base station. The UE may decode the higher layer configuration(s) to identify an indication of resource allocation for one or more UL-RS configurations a second set of BWP(s). Based on the indication, the UE may apply the configuration for the transmission of the UL-RS.

In an embodiment, the UE is not required to perform decoding of information on a downlink channel such as PDCCH or PDSCH on the second BWP.

According to an embodiment, the UE is configured to transmit over the second set of BWPs independent from a connected/inactive/idle state of the UE over the first set BWP(s).

In an embodiment, the UE reports the DL measurements performed on the second BWP set over the first BWP set (via PUSCH or PUCCH).

According to an embodiment, the UE may receive on a first BWP a downlink channel including an activation or triggering for an uplink reference signal transmission from a network entity or a base station.

In an embodiment, a synchronization for transmitting the uplink reference signal is derived from a signal in a from the first BWP.

According to an embodiment, the synchronization for receiving the downlink reference signal is derived from a signal in a from the first BWP.

In an embodiment, a SUPL (supplementary Uplink) may, e.g., be employed, for example using another frequency band (e.g. FR1) or CC or an unlicensed band.

According to an embodiment, the first BWP set may, e.g., be configured from a serving TRP configuring a second BWP on a neighboring TRP.

In an embodiment, the second BWP is larger than the first BWP.

According to an embodiment, for positioning purpose, a transmit only BWP may, e.g., be employed/configured.

In an embodiment, the allocation of position slots may, e.g., be coordinated between different carriers. For example, two adjacent carrier frequencies may, e.g., be aggregated and used for wideband transmission.

According to an embodiment, the second BWP may, e.g., be employed as a WPS; for positioning only usage.

In an embodiment, for the $2^{nd}$ BWP, the UE may, e.g., receiving a configuration to transmit an UL-RS or receive a DL-RS.

According to an embodiment, two or more BWPs may, e.g., be employed for reception or transmission.

In an embodiment, the allocation of position slots may, e.g., be coordinated between different carriers. For example, two adjacent carrier frequencies may, e.g., be aggregated and used for wideband transmission.

According to an embodiment, a UE capability on positioning capabilities on the second BWP exceeding the communication capabilities over the $1^{st}$ BWP may, e., be provided.

A measurement gap configuration based on the UE capability may, e.g., be conducted.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 10:
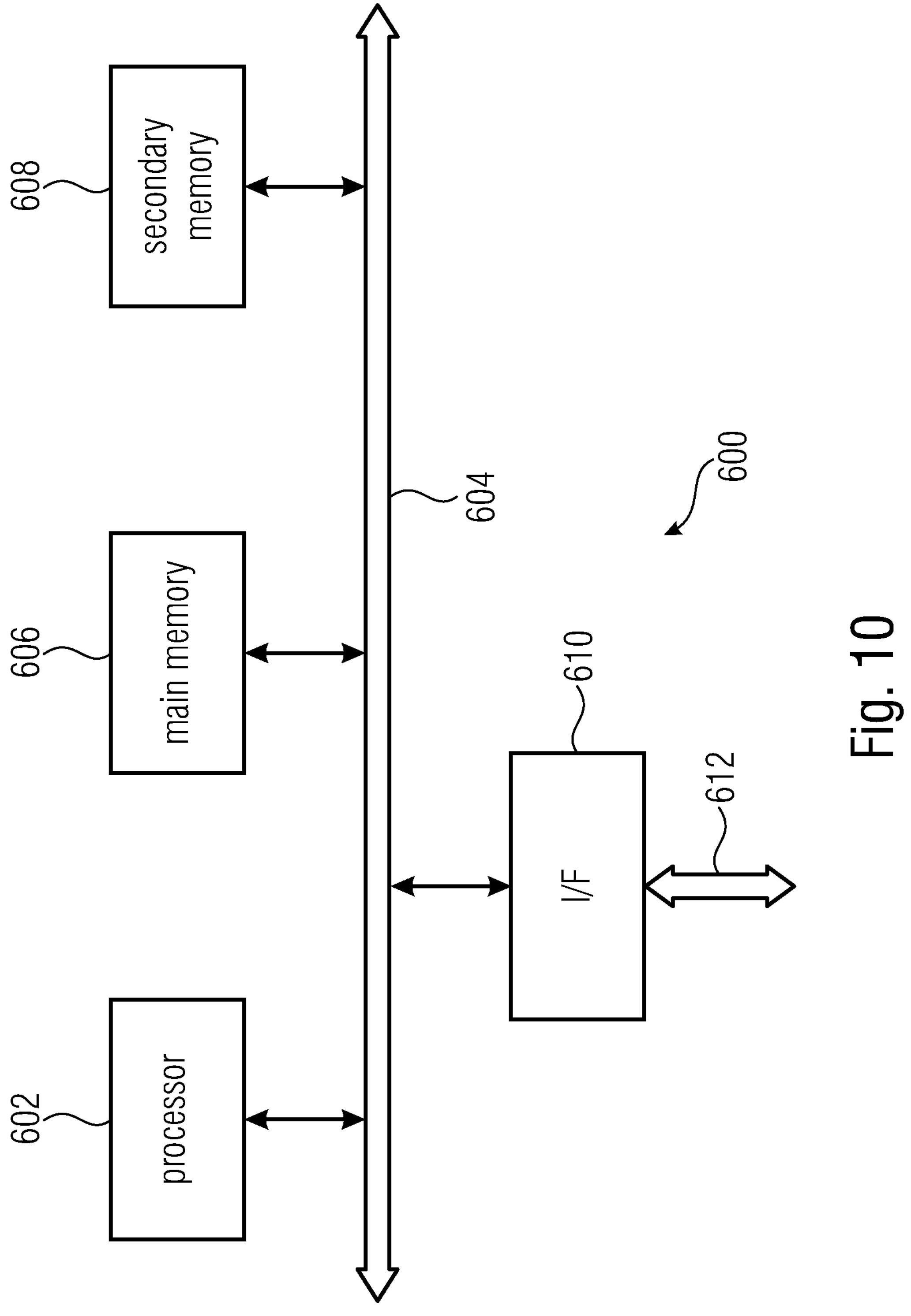
FIG. 10 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

| | |
|---|---|
| RRC | TS38.331 v16.1.0 |
| LPP | TS37.355 v16.1.0 |
| NRPPa | TS38.455 v16.0.0 |

Abbreviations

| Abbreviation | Definition |
|---|---|
| 3GPP | third generation partnership project |
| 5GC | 5G core network |
| BS | base station |
| CSI-RS | channel state information reference signal |
| DMRS | demodulation reference signal |
| DOA | direction of arrival |
| E-CID | enhanced cell ID |
| eNB | evolved node b |
| E-SMLC | evolved serving mobile location center. |
| E-UTRA | evolved UMTS terrestrial radio access |
| gNB | next generation node-b |
| GPS | Global Positioning System |
| LMF | location management function |
| LMU | location measurement unit |
| LPP | LTE positioning protocol |
| LTE | Long-term evolution |
| NG | next generation |
| ng-eNB | next generation eNB |
| NG-RAN | either a gNB or an ng-eNB |
| NR | new radio |
| NRPPa | new radio positioning protocol a |
| OTDOA | observe time difference of arrival |
| PRS | position reference signal |
| PTRS | phase tracking reference signal |
| QCL | quasi colocation |
| RAN | radio access network |
| RP | reception point |
| RSTD | reference signal time difference |
| RTOA | relative time of arrival |
| RTT | round trip time |
| SA | Standalone |
| SRS | sounding reference signal |
| TDM | Time Domain Multiplexing |
| TOF | time of flight |
| TRP | transmission reception point |
| RS | reference signal |
| QCL | quasi co-located |
| AoA | Angle of Arrival |
| AoD | Angle of Departure |
| PAS | Power Angular Spectrum |
| NR | New Radio |

The invention claimed is:

1. A user equipment for transmitting and receiving data in a wireless communication system, wherein the user equipment is configured to receive a configuration message over one or more first sidelink resources from another user equipment over a sidelink, wherein the configuration message comprises configuration information indicating one or more second sidelink resources, wherein a total bandwidth of the one or more second sidelink resources used for receiving, by the user equipment, the reference signal from the other user equipment is larger than a total bandwidth of the one or more first sidelink resources used for receiving the configuration message from the other user equipment, wherein the user equipment is configured to employ the configuration information for receiving as the reference signal a sidelink reference signal for positioning over the one or more second sidelink resources from the other user equipment, wherein the user equipment is configured to measure one or more properties of the sidelink reference signal received by the user equipment over the one or more second resources depending on a reception capability for positioning of the user equipment.

2. The user equipment according to claim 1, wherein a bandwidth part comprises the first sidelink resources in at least one first frequency region and comprises the second sidelink resources in at least one second frequency region, wherein the user equipment is configured to receive the configuration message from the other user equipment in the at least one first frequency region of the bandwidth part, wherein the user equipment is configured to receive the reference signal from the other user equipment in the at least one second frequency region of the bandwidth part, wherein a total bandwidth of the at least one second frequency region is larger than a total bandwidth of the at least one first frequency region.

3. The user equipment according to claim 2, wherein the user equipment is configured to receive the configuration message over the one or more first resources being a first set of one or more bandwidth parts comprising the bandwidth part, wherein the user equipment is configured to employ the configuration information to transmit or to receive the reference signal over the one or more second resources being a second set of one or more bandwidth parts.

4. The user equipment according to claim 1, wherein the user equipment is configured to receive the configuration message over the one or more first resources being a first set of one or more bandwidth parts, wherein the user equipment is configured to employ the configuration information to transmit or to receive the reference signal over the one or more second resources being a second set of one or more bandwidth parts.

5. The user equipment according to claim 4, wherein at least one of the following applies:

the user equipment is configured to transmit the reference signal over the second set of one or more bandwidth parts irrespective of a state of the user equipment with respect to the first set of one or more bandwidth parts;

an orthogonal frequency division multiplex parameter configuration of the second set of one or more bandwidth parts differs from an orthogonal frequency division multiplex parameter configuration of the first set of one or more bandwidth parts at least in that a cyclic prefix length is different or in that a subcarrier spacing is different;

the user equipment is configured to receive in at least one of the one or more first bandwidth parts an encoded indication, wherein the user equipment is configured to decode the encoded indication to determine for each of one or more uplink reference signal configurations a bandwidth part allocation as the uplink configuration information, wherein the user equipment is configured to employ the uplink configuration information to transmit the reference signal.

6. The user equipment according to claim 4, wherein the user equipment is configured to conduct one or more measurements of the second set of one or more bandwidth parts; and wherein at least one of the following applies:

the user equipment is configured to report on the one or more measurements of the second set of one or more bandwidth parts;

the user equipment is configured to receive information on a downlink channel over the first set of one or more bandwidth parts;

and wherein the user equipment is configured to receive on the downlink channel an activation or a triggering for a transmission of the reference signal; and wherein the user equipment is configured to transmit the reference signal depending on the activation or the triggering.

7. The user equipment according to claim 4, wherein the user equipment is configured to acquire synchronization information from the first set of one or more bandwidth parts; and wherein the user equipment is configured to synchronize a transmission or a reception of the reference signal depending on the synchronization information.

8. The user equipment according to claim 4, wherein the user equipment is configured to receive the configuration message over the one or more first resources, wherein the one or more first resources comprise two or more component carriers or comprise at least one unlicensed band.

9. The user equipment according to claim 4, wherein the user equipment is configured to receive the configuration message over the first set of one or more bandwidth parts from a first base station, wherein the configuration message indicates the second set of one or more bandwidth parts for a second base station, wherein the user equipment is configured to transmit the reference signal over the second set of one or more bandwidth parts to the second base station, or wherein the user equipment is configured to receive the reference signal over the second set of one or more bandwidth parts from the second base station.

10. The user equipment according to claim 4, wherein the user equipment is configured to transmit or to receive the reference signal over the second set of one or more bandwidth parts for positioning; or wherein for positioning the second set of one or more bandwidth parts is configured as one or more transmit-only bandwidth parts; or wherein the second set of one or more bandwidth parts comprises two carriers with adjacent carrier frequencies; or wherein the user equipment is configured to employ two or more bandwidth parts for transmitting or for receiving the reference signal for positioning.

11. The user equipment according to claim 1, wherein the user equipment is configured to apply an uplink reference signal configuration over the one or more second resources depending on a transmission capability for positioning of the user equipment.

12. The user equipment according to claim 11, wherein if the transmission capability for positioning of the user equipment comprises a transmit-only capability for at least one of a carrier and a bandwidth used by the reference signal for positioning, the user equipment is configured to perform one or more downlink reference signal measurements on the one or more first resources by conducting at least one of one or more power control measurements, one or more timing advance measurements and one or more spatial filter selection measurements; or wherein the user equipment is configured to perform one or more downlink reference signal measurements on the one or more second resources.

13. The user equipment according to claim 1, wherein the user equipment is configured to measure one or more properties of a downlink reference signal received by the user equipment over the one or more second resources depending on a reception capability for positioning of the user equipment, wherein the user equipment is configured to receive assistance data corresponding to one or more downlink reference signals on the one or more first resources.

14. The user equipment according to claim 1, wherein at least one of the following applies:

the user equipment is configured to receive the configuration message from a network entity of the wireless communication system, wherein the user equipment is configured to transmit or to receive the reference signal from the network entity, and wherein the network entity is a base station, or the network entity is another user equipment.

15. A user equipment for transmitting and receiving data in a wireless communication system, wherein the user equipment is configured to transmit a configuration message over one or more first sidelink resources to another user equipment over a sidelink, wherein the configuration message comprises configuration information indicating one or more second sidelink resources, wherein a total bandwidth of the one or more second sidelink resources used for transmitting, by the user equipment, the reference signal to the other user equipment is larger than a total bandwidth of the one or more first sidelink resources used for transmitting the configuration message to the other user equipment, wherein the user equipment is configured to transmit as the reference signal a sidelink reference signal for positioning over the one or more second sidelink resources to the other user equipment.

16. The user equipment according to claim 15, wherein a bandwidth part comprises the first sidelink resources in at least one first frequency region and comprises the second sidelink resources in at least one second frequency region, wherein the user equipment is configured to transmit the configuration message to the other user equipment in the at least one first frequency region of the bandwidth part, wherein the user equipment is configured to transmit the reference signal to the other user equipment in the at least one second frequency region of the bandwidth part, wherein a total bandwidth of the at least one second frequency region is larger than a total bandwidth of the at least one first frequency region.

17. The user equipment according to claim 15, wherein the user equipment is configured to apply an uplink reference signal configuration over the one or more second resources depending on a transmission capability for positioning of the user equipment.

18. The user equipment according to claim 17, wherein if the transmission capability for positioning of the user equipment comprises a transmit-only capability for at least one of a carrier and a bandwidth used by the reference signal for positioning, the user equipment is configured to perform one or more downlink reference signal measurements on the one or more first resources by conducting at least one of one or more power control measurements, one or more timing advance measurements and one or more spatial filter selection measurements.

19. The user equipment according to claim 17, wherein the user equipment is configured to perform one or more downlink reference signal measurements on the one or more second resources.

20. The user equipment according to claim 15, wherein the user equipment is configured to measure one or more properties of a downlink reference signal received by the user equipment over the one or more second resources depending on a reception capability for positioning of the user equipment, wherein the user equipment is configured to receive assistance data corresponding to one or more downlink reference signals on the one or more first resources.

21. The user equipment according to claim 15, wherein at least one of the following applies:

the user equipment is configured to receive the configuration message from a network entity of the wireless communication system, the user equipment is configured to transmit or to receive the reference signal from the network entity, and wherein the network entity is a base station, or the network entity is another user equipment.

22. A method for transmitting and receiving data by a user equipment in a wireless communication system, receiving, by the user equipment, a configuration message over one or more first sidelink resources from another user equipment over a sidelink, wherein the configuration message comprises configuration information indicating one or more second sidelink resources, wherein a total bandwidth of the one or more second sidelink resources used for receiving, by the user equipment, the reference signal from the other user equipment is larger than a total bandwidth of the one or more first sidelink resources used for receiving the configuration message from the other user equipment, employing, by the user equipment, the configuration information for receiving as the reference signal a sidelink reference signal for positioning over the one or more second sidelink resources from the other user equipment, measuring, by the user equipment, one or more properties of the sidelink reference signal received by the user equipment over the one or more second resources depending on a reception capability for positioning of the user equipment.

23. A non-transitory computer-readable medium comprising a computer program for implementing the method of claim 22, when the method is implemented by a computer or signal processor.

24. A method for transmitting and receiving data by a user equipment in a wireless communication system, transmitting, by the user equipment, a configuration message over one or more first sidelink resources to another user equipment over a sidelink, wherein the configuration message comprises configuration information indicating one or more second sidelink resources, wherein a total bandwidth of the one or more second sidelink resources used for transmitting, by the user equipment, the reference signal to the other user equipment is larger than a total bandwidth of the one or more first sidelink resources used for transmitting the configuration message to the other user equipment, transmitting, by the user equipment, as the reference signal a sidelink reference signal for positioning over the one or more second sidelink resources to the other user equipment.

25. A non-transitory computer-readable medium comprising a computer program for implementing the method of claim 24, when the method is implemented by a computer or signal processor.

* * * * *